(12) United States Patent
Kawamura et al.

(10) Patent No.: US 10,618,599 B2
(45) Date of Patent: Apr. 14, 2020

(54) BICYCLE OPERATING DEVICE

(71) Applicant: SHIMANO INC., Sakai (JP)

(72) Inventors: Shinji Kawamura, Sakai (JP); Kentaro Kosaka, Sakai (JP); Yoshimitsu Miki, Sakai (JP)

(73) Assignee: SHIMANO INC., Sakai (JP)

( * ) Notice: Subject to any disclaimer, the term of this patent is extended or adjusted under 35 U.S.C. 154(b) by 156 days.

(21) Appl. No.: 15/417,221

(22) Filed: Jan. 27, 2017

(65) Prior Publication Data

US 2018/0215445 A1 Aug. 2, 2018

(51) Int. Cl.
*B62M 25/04* (2006.01)
*B62K 23/06* (2006.01)
*B62L 3/02* (2006.01)

(52) U.S. Cl.
CPC ............ *B62M 25/04* (2013.01); *B62K 23/06* (2013.01); *B62L 3/023* (2013.01)

(58) Field of Classification Search
CPC ..... B62M 25/04; B62M 25/045; B62K 23/06; B62L 3/023
See application file for complete search history.

(56) References Cited

U.S. PATENT DOCUMENTS

| 5,400,675 | A | * | 3/1995 | Nagano | ................. | B62K 23/06 |
| | | | | | | 74/471 XY |
| 8,375,823 | B2 | * | 2/2013 | Funai | ..................... | B62K 23/06 |
| | | | | | | 74/502.2 |
| 9,446,813 | B2 | * | 9/2016 | Shipman | ................ | B62K 23/06 |
| 2010/0083788 | A1 | | 4/2010 | Jordan et al. | | |
| 2013/0233112 | A1 | | 9/2013 | Miki et al. | | |

* cited by examiner

*Primary Examiner* — Thomas C Diaz
(74) *Attorney, Agent, or Firm* — Mori & Ward, LLP

(57) ABSTRACT

A bicycle operating device comprises a base member, an operating structure, and a support plate. The operating structure includes a rotatable member rotatable relative to the base member about a rotational axis to control a bicycle component. The operating structure includes a first axial end and a second axial end. The first axial end is secured to the base member. The second axial end is opposite to the first axial end along the rotational axis. The support plate is attached to the second axial end to be movable relative to the base member and contactable with the base member.

32 Claims, 30 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, an operating structure, and a support plate. The operating structure includes a rotatable member rotatable relative to the base member about a rotational axis to control a bicycle component. The operating structure includes a first axial end and a second axial end. The first axial end is secured to the base member. The second axial end is opposite to the first axial end along the rotational axis. The support plate is attached to the second axial end to be movable relative to the base member and contactable with the base member.

With the bicycle operating device according to the first aspect, the support plate improves ease of assembly of the bicycle operating device with maintaining rigidity of the bicycle operating device.

In accordance with a second aspect of the present invention, the bicycle operating device according to the first aspect is configured so that the base member includes a first inner surface. The support plate includes a first support surface facing the first inner surface.

With the bicycle operating device according to the second aspect, the support plate maintains rigidity of the bicycle operating device around the first support surface of the support plate.

In accordance with a third aspect of the present invention, the bicycle operating device according to the second aspect is configured so that a first clearance is defined between the first support surface of the support plate and the first inner surface of the base member.

With the bicycle operating device according to the third aspect, the first clearance further improves ease of assembly of the bicycle operating device with maintaining rigidity of the bicycle operating device.

In accordance with a fourth aspect of the present invention, the bicycle operating device according to the third aspect is configured so that the first clearance is equal to or smaller than 5 mm.

With the bicycle operating device according to the fourth aspect, the first clearance effectively improves ease of assembly of the bicycle operating device with maintaining rigidity of the bicycle operating device.

In accordance with a fifth aspect of the present invention, the bicycle operating device according to the third or fourth aspect is configured so that the first clearance is equal to or smaller than 1 mm.

With the bicycle operating device according to the fifth aspect, the first clearance more effectively improves ease of assembly of the bicycle operating device with maintaining rigidity of the bicycle operating device.

In accordance with a sixth aspect of the present invention, the bicycle operating device according to the second aspect is configured so that the first support surface of the support plate is in contact with the first inner surface of the base member.

With the bicycle operating device according to the sixth aspect, the support plate maintains rigidity of the bicycle operating device around the first support surface of the support plate.

In accordance with a seventh aspect of the present invention, the bicycle operating device according to the second aspect is configured so that the base member includes a second inner surface. The support plate includes a second support surface facing the second inner surface.

With the bicycle operating device according to the seventh aspect, the support plate maintains rigidity of the bicycle operating device around the second support surface of the support plate.

In accordance with an eighth aspect of the present invention, the bicycle operating device according to the seventh aspect is configured so that a second clearance is defined between the second support surface of the support plate and the second inner surface of the base member.

With the bicycle operating device according to the eighth aspect, the second clearance further improves ease of assembly of the bicycle operating device with maintaining rigidity of the bicycle operating device.

In accordance with a ninth aspect of the present invention, the bicycle operating device according to the eighth aspect is configured so that the second clearance is equal to or smaller than 5 mm.

With the bicycle operating device according to the ninth aspect, the second clearance effectively improves ease of assembly of the bicycle operating device with maintaining rigidity of the bicycle operating device.

In accordance with a tenth aspect of the present invention, the bicycle operating device according to the eighth or ninth aspect is configured so that the second clearance is equal to or smaller than 1 mm.

With the bicycle operating device according to the tenth aspect, the second clearance more effectively improves ease of assembly of the bicycle operating device with maintaining rigidity of the bicycle operating device.

In accordance with an eleventh aspect of the present invention, the bicycle operating device according to the seventh aspect is configured so that the rotational axis is provided between the first support surface and the second support surface as viewed along the rotational axis.

With the bicycle operating device according to the eleventh aspect, the positional relationship between the rotational axis and the support plate further improves ease of assembly of the bicycle operating device with maintaining rigidity of the bicycle operating device.

In accordance with a twelfth aspect of the present invention, the bicycle operating device according to the second aspect is configured so that the support plate includes a base part and a first part. The base part is attached to the second axial end of the operating structure. The first part extends from the base part along the first inner surface. The first support surface is provided on the first part.

With the bicycle operating device according to the twelfth aspect, the support plate maintains rigidity of the bicycle operating device around the first support surface of the support plate with a simple structure of the support plate.

In accordance with a thirteenth aspect of the present invention, the bicycle operating device according to the twelfth aspect is configured so that the base member includes a second inner surface. The support plate includes a second support and a second part. The second support surface faces the second inner surface. The second part extends from the base part along the second inner surface. The second support surface is provided on the second part.

With the bicycle operating device according to the thirteenth aspect, the support plate maintains rigidity of the bicycle operating device around the first support surface of the support plate with a simple structure of the support plate.

In accordance with a fourteenth aspect of the present invention, the bicycle operating device according to the thirteenth aspect is configured so that the first part extends from the base part in a first direction. The second part extends from the base part in a second direction. The base part extends from the second axial end in a third direction different from each of the first direction and the second direction.

With the bicycle operating device according to the fourteenth aspect, the support plate effectively maintains rigidity of the bicycle operating device around the first support surface of the support plate with a simple structure of the support plate.

In accordance with a fifteenth aspect of the present invention, the bicycle operating device according to the fourteenth aspect is configured so that at least one of the first direction and the second direction is parallel to the rotational axis.

With the bicycle operating device according to the fifteenth aspect, the support plate more effectively maintains rigidity of the bicycle operating device around the first support surface of the support plate with a simple structure of the support plate.

In accordance with a sixteenth aspect of the present invention, the bicycle operating device according to the fourteenth aspect is configured so that the third direction is perpendicular to the rotational axis.

With the bicycle operating device according to the sixteenth aspect, the support plate more effectively maintains rigidity of the bicycle operating device around the first support surface of the support plate with a simple structure of the support plate.

In accordance with a seventeenth aspect of the present invention, the bicycle operating device according to the fourteenth aspect is configured so that at least one of the first support surface and the second support surface faces in the third direction.

With the bicycle operating device according to the seventeenth aspect, the support plate effectively receives force in the third direction.

In accordance with an eighteenth aspect of the present invention, the bicycle operating device according to any one of the first to seventeenth aspects is configured so that the bicycle component includes a shift device configured to change a gear position. The rotatable member is rotatable relative to the base member about the rotational axis to operate the shift device.

With the bicycle operating device according to the eighteenth aspect, the support plate improves ease of assembly of the bicycle operating device with maintaining rigidity of the bicycle operating device in a case where the bicycle operating device is used to operate the shift device.

In accordance with a nineteenth aspect of the present invention, the bicycle operating device according to any one of the first to eighteenth aspect is configured so that the base member includes a first end portion and a second end portion. The first end portion is configured to be coupled to a bicycle handlebar in a mounting state where the bicycle operating device is mounted to the bicycle handlebar. The second end portion is opposite to the first end portion. The operating structure is provided between the first end portion and the second end portion.

With the bicycle operating device according to the nineteenth aspect, the support plate improves ease of assembly of the bicycle operating device with maintaining rigidity of the bicycle operating device in a case where the bicycle operating device is a road-bike operating device.

In accordance with a twentieth aspect of the present invention, the bicycle operating device according to the nineteenth aspect is configured so that the first end portion includes a mounting surface having a curved shape corresponding to a drop-down handlebar.

With the bicycle operating device according to the twentieth aspect, the support plate effectively improves ease of assembly of the bicycle operating device with maintaining rigidity of the bicycle operating device in a case where the bicycle operating device is the road-bike operating device.

In accordance with a twenty-first aspect of the present invention, the bicycle operating device according to the nineteenth or twentieth aspect is configured so that the base member includes a grip portion arranged between the first end portion and the second end portion.

With the bicycle operating device according to the twenty-first aspect, the support plate effectively improves ease of assembly of the bicycle operating device with maintaining rigidity of the bicycle operating device in a case where the bicycle operating device is the road-bike operating device.

In accordance with a twenty-second aspect of the present invention, the bicycle operating device according to any one of the nineteenth to twenty-first aspects is configured so that the second end portion includes a pommel portion.

With the bicycle operating device according to the twenty-second aspect, the support plate effectively improves ease of assembly of the bicycle operating device with maintaining rigidity of the bicycle operating device in a case where the bicycle operating device is the road-bike operating device.

In accordance with a twenty-third aspect of the present invention, the bicycle operating device according to any one of the first to twenty-second aspects is configured so that the operating structure includes a rotational shaft rotatably supporting the rotatable member about the rotational axis. The rotational shaft includes the first axial end and the second axial end and extends between the first axial end and the second axial end.

With the bicycle operating device according to the twenty-third aspect, it is possible to utilize the rotational shaft of the operating structure to attach the support plate to the operating structure.

In accordance with a twenty-fourth aspect of the present invention, a bicycle operating device comprises a base member, an operating structure, and a support plate. The base member includes a first inner surface. The operating structure includes a rotatable member rotatable relative to the base member about a rotational axis to control a bicycle component. The operating structure includes a first axial end and a second axial end. The first axial end is secured to the base member. The second axial end is opposite to the first axial end along the rotational axis. The support plate is attached to the second axial end. The support plate includes a first support surface facing the first inner surface in a facing direction different from a direction parallel to the rotational axis.

With the bicycle operating device according to the twenty-fourth aspect, the support plate improves ease of assembly of the bicycle operating device with maintaining rigidity of the bicycle operating device.

In accordance with a twenty-fifth aspect of the present invention, the bicycle operating device according to the twenty-fourth aspect is configured so that the facing direction is perpendicular to the rotational axis.

With the bicycle operating device according to the twenty-fifth aspect, the support plate effectively maintains rigidity of the bicycle operating device.

In accordance with a twenty-sixth aspect of the present invention, the bicycle operating device according to the twenty-fourth or twenty-fifth aspect is configured so that a first clearance is defined between the first support surface of the support plate and the first inner surface of the base member.

With the bicycle operating device according to the twenty-sixth aspect, the first clearance further improves ease of assembly of the bicycle operating device with maintaining rigidity of the bicycle operating device.

In accordance with a twenty-seventh aspect of the present invention, the bicycle operating device according to the twenty-sixth aspect is configured so that the first clearance is equal to or smaller than 5 mm.

With the bicycle operating device according to the twenty-seventh aspect, the first clearance effectively improves ease of assembly of the bicycle operating device with maintaining rigidity of the bicycle operating device.

In accordance with a twenty-eighth aspect of the present invention, the bicycle operating device according to the twenty-sixth or twenty-seventh aspect is configured so that the first clearance is equal to or smaller than 1 mm.

With the bicycle operating device according to the twenty-eighth aspect, the first clearance more effectively improves ease of assembly of the bicycle operating device with maintaining rigidity of the bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
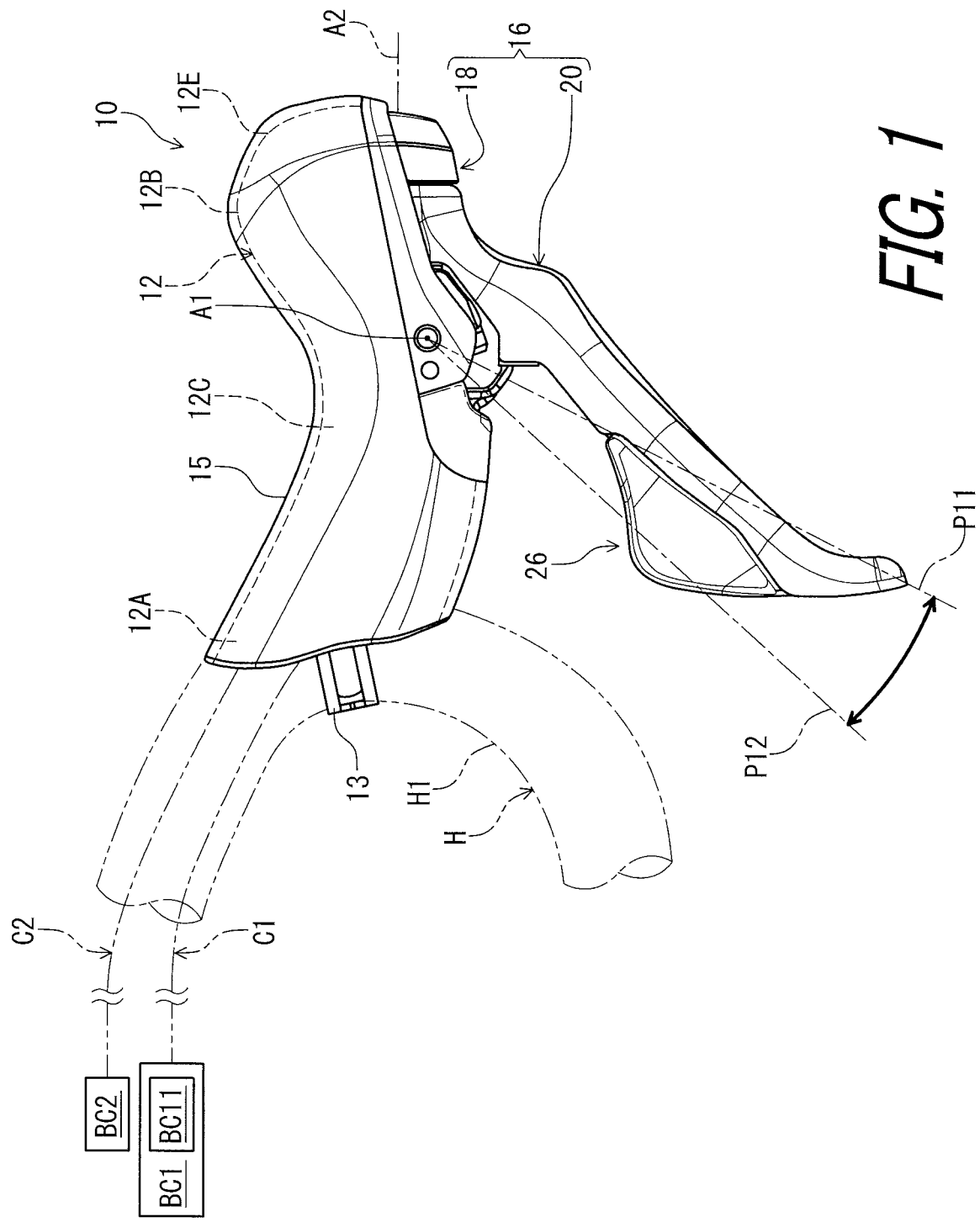
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle handlebar H. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The bicycle handlebar H can also be referred to as the drop-down handlebar H. Furthermore, the bicycle operating device 10 can be mounted to parts other than the bicycle handlebar H in the bicycle. Since structures of the bicycle have been known in the bicycle field, they will not be described in detail here for the sake of brevity.

The bicycle operating device 10 is operatively coupled to a bicycle component BC1. In this embodiment, the bicycle operating device 10 is operatively coupled to the bicycle component BC1 with a control cable C1. Examples of the bicycle component BC1 include a shift device, an adjustable seatpost assembly, and a bicycle suspension. Examples of the control cable C1 include a Bowden cable. In this embodiment, the bicycle component BC1 includes a shift device BC11 configured to change a gear position.

Furthermore, the bicycle operating device 10 is operatively coupled to an additional bicycle component BC2 such as a hydraulic bicycle brake. In this embodiment, the bicycle operating device 10 is operatively coupled to the additional bicycle component BC2 with a hydraulic hose C2. However, the additional bicycle component BC2 can be a bicycle component other than the hydraulic bicycle brake. The additional bicycle component BC2 can be omitted from the bicycle operating device 10.

In this embodiment, the bicycle operating device 10 is a right-hand side control device configured to be operated by the rider's right hand to actuate the additional bicycle component BC2 and the bicycle component BC1. However, the structures of the bicycle operating device 10 can be applied to a left-hand side control device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12. The base member 12 is configured to be mounted to the bicycle handlebar H. However, the base member 12 can be mounted to parts other than the bicycle handlebar H in a bicycle. The base member 12 includes a first end portion 12A, a second end portion 12B, and a grip portion 12C. The first end portion 12A is configured to be coupled to the bicycle handlebar H in a mounting state where the bicycle operating device 10 is mounted to the bicycle handlebar H. The second end portion 12B is opposite to the first end portion 12A. The grip portion 12C is arranged between the first end portion 12A and the second end portion 12B.

The drop-down handlebar H includes a curved part H1. The first end portion 12A is configured to be coupled to the curved part H1 in a mounting state where the bicycle operating device 10 is mounted to the bicycle handlebar H. The bicycle operating device 10 comprises a mounting clamp 13 to couple the base member 12 to the bicycle handlebar H.

Figure 2:
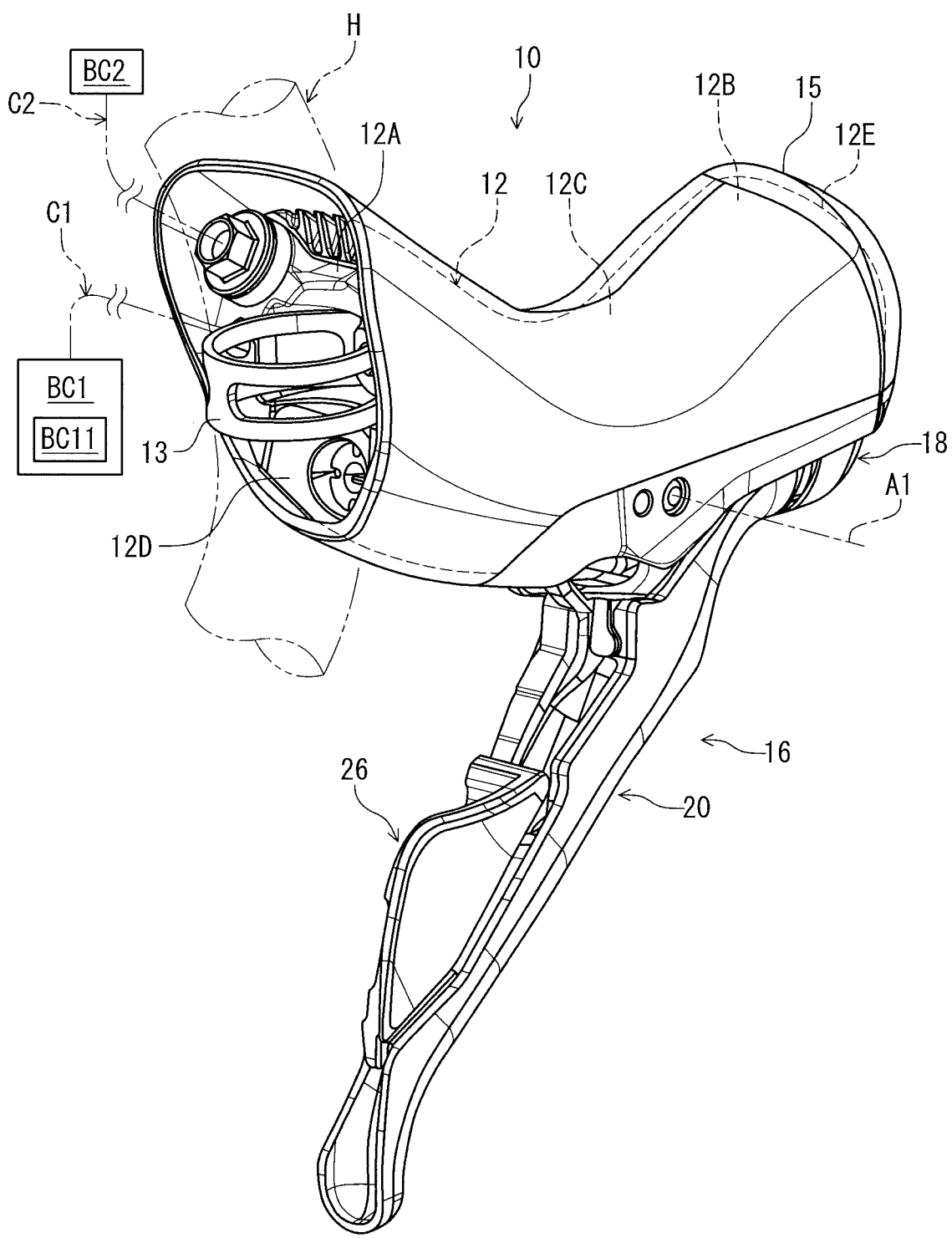
FIG. 2 is a perspective view of the bicycle operating device illustrated in FIG. 1.

As seen in FIG. 2, the first end portion 12A includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the second end portion 12B includes a pommel portion 12E. The pommel portion 12E extends obliquely upward from the grip portion 12C. The pommel portion 12E is disposed above the second end portion 12B in the mounting state of the bicycle operating device 10. The pommel portion 12E can also be configured to be graspable if needed and/or desired.

In this embodiment, the bicycle operating device 10 further comprises a grip cover 15 attached to the base member 12 to at least partly cover the base member 12. The grip cover 15 is at least partly made of an elastic material such as rubber.

As seen in FIG. 1, the bicycle operating device 10 comprises an operating member 16 pivotally coupled to the base member 12 about a pivot axis A1. The operating member 16 extends downward from the base member 12 in the mounting state of the bicycle operating device 10. The operating member 16 is pivotable relative to the base member 12 between a rest position P11 and an operated position P12. In this embodiment, the operating member 16 is provided as a brake operating lever pivotable about the pivot axis A1. However, the operating member 16 is not limited to the brake operating lever.

In the present application, the term "rest position" as used herein refers to a position at which a movable part such as the operating member 16 remains stationary in a state where the movable part is not operated by the user. The twin "operated position" as used herein refers to a position at which the movable part has been operated by the user to perform the operation of the bicycle component.

Figure 3:
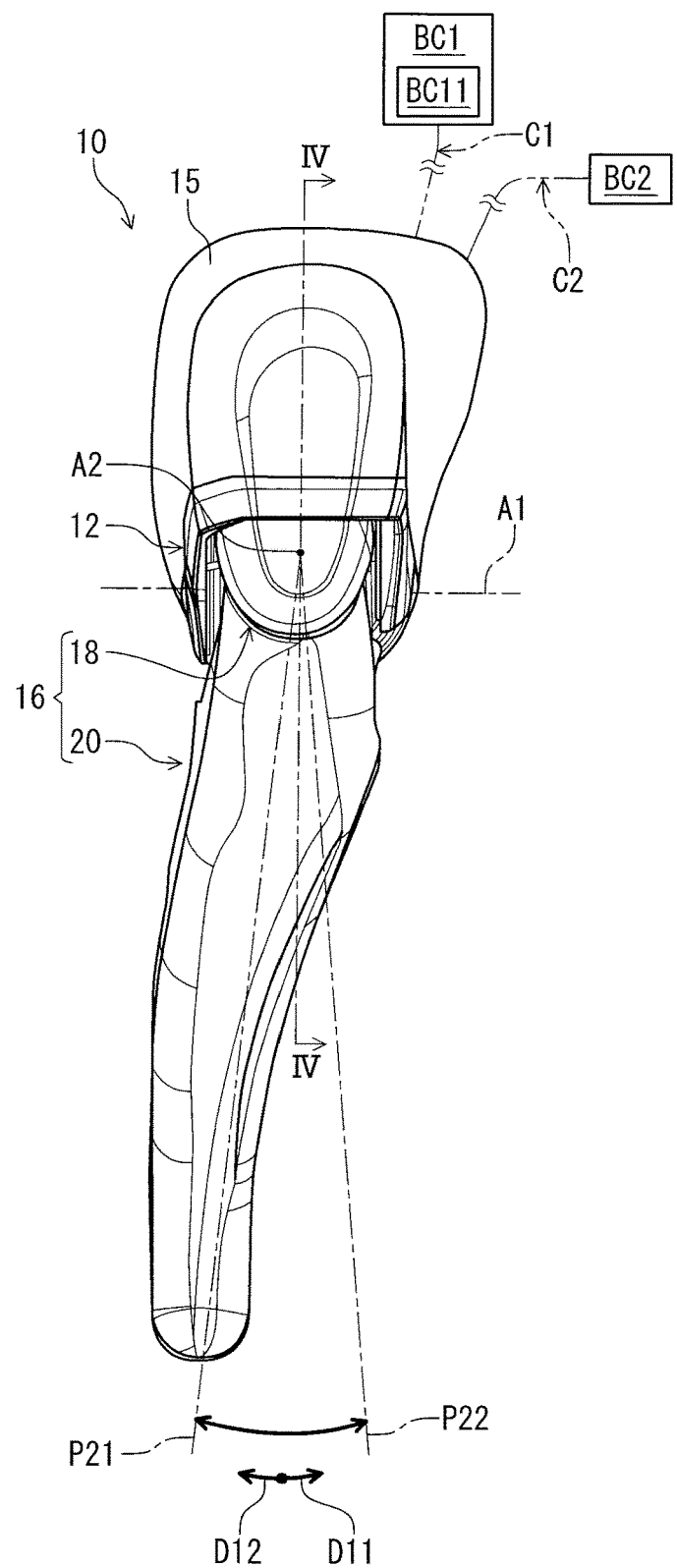
FIG. 3 is a front view of the bicycle operating device illustrated in FIG. 1.

As seen in FIG. 3, the operating member 16 is pivotable relative to the base member 12 about the additional pivot axis A2. The operating member 16 is pivotable relative to the base member 12 between a first rest position P21 and a first operated position P22. The operating member 16 is pivoted relative to the base member 12 from the first rest position P21 to the first operated position P22 in a first operating direction D11. The operating member 16 is pivoted relative to the base member 12 from the first operated position P22 toward the first rest position P21 in a first release direction D12 opposite to the first operating direction D11. The first operating direction D11 and the first release direction D12 are defined along a circumferential direction defined about the additional pivot axis A2. In this embodiment, the operating member 16 is provided as a shift lever pivotable about the additional pivot axis A2. However, the operating member 16 is not limited to the shift lever.

As seen in FIGS. 1 and 3, the operating member 16 includes an adapter 18 and an operating lever 20. The adapter 18 is pivotally coupled to the base member 12 about the pivot axis A1. The operating lever 20 is pivotally coupled to the adapter 18 about the additional pivot axis A2 non-parallel to the pivot axis A1. Namely, the operating lever 20 is pivotally coupled to the base member 12 about each of the pivot axis A1 and the additional pivot axis A2.

Figure 4:
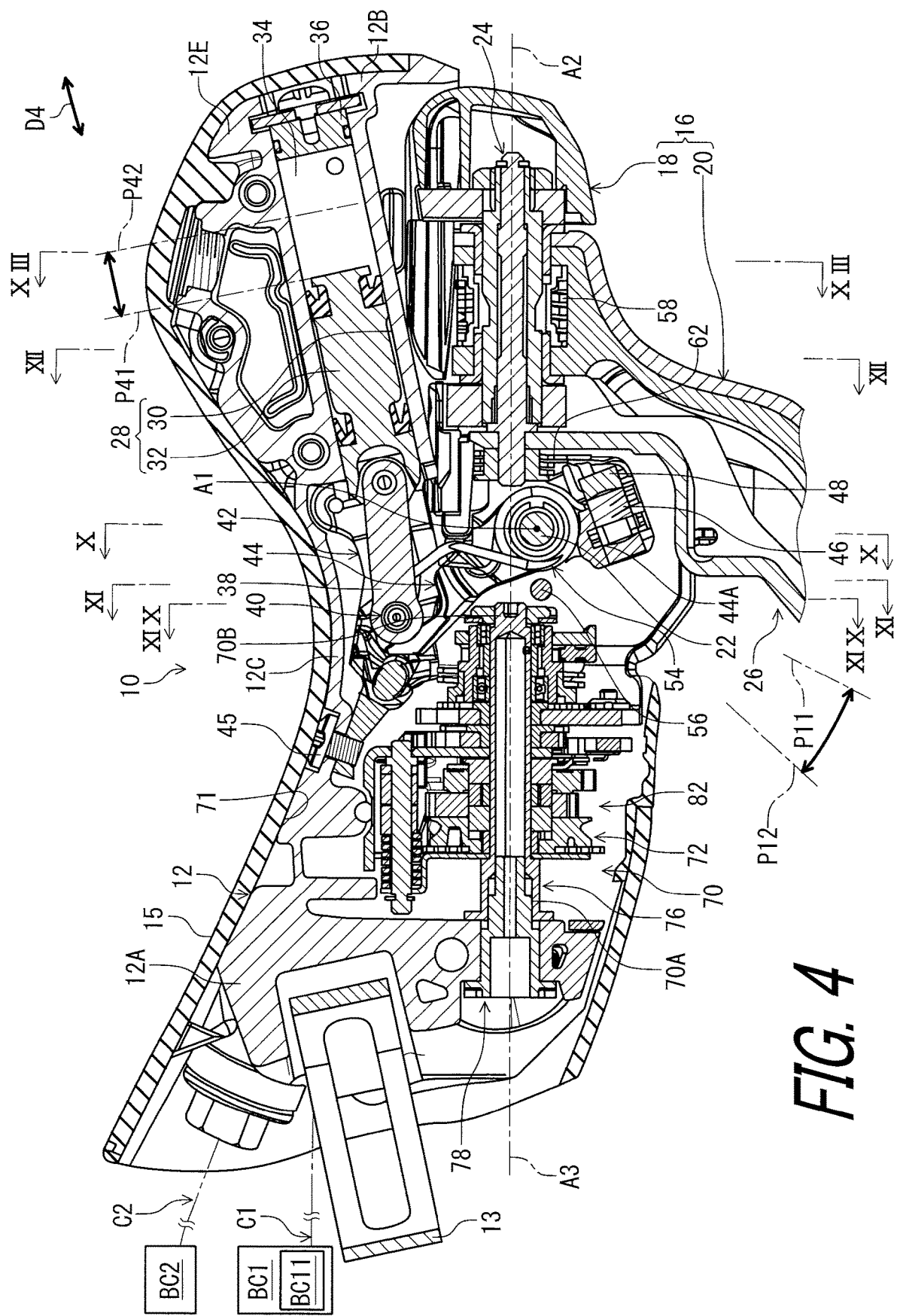
FIG. 4 is a partial cross-sectional view of the bicycle operating device taken along line IV-IV of FIG. 3.

As seen in FIG. 4, the bicycle operating device 10 comprises a pivot shaft 22 and an operating shaft 24. The pivot shaft 22 pivotally couples the adapter 18 to the base member 12 about the pivot axis A1. The pivot shaft 22 defines the pivot axis A1. The operating shaft 24 pivotally couples the operating lever 20 to the adapter 18 about the additional pivot axis A2. The operating shaft 24 defines the additional pivot axis A2.

Figure 5:
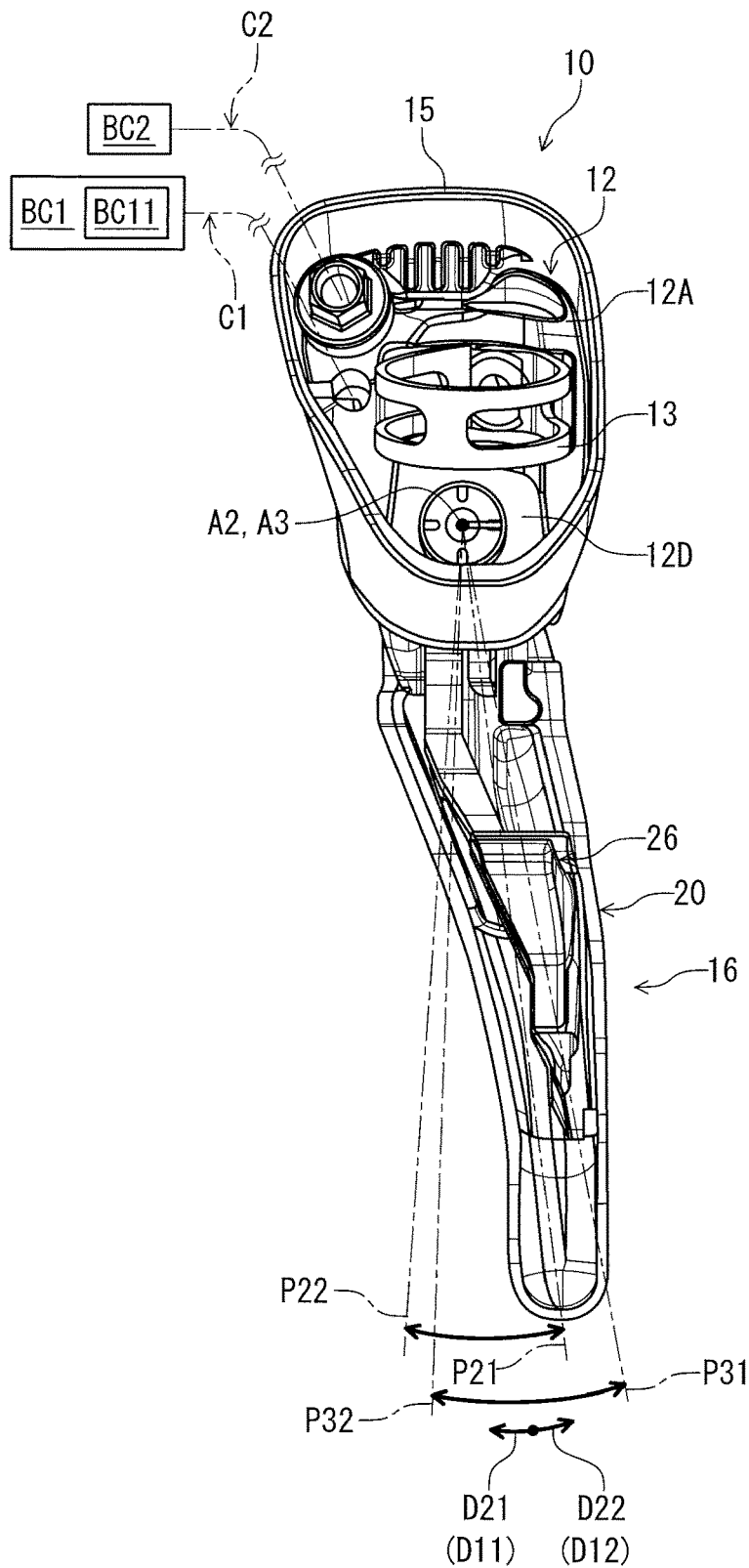
FIG. 5 is a rear view of the bicycle operating device illustrated in FIG. 1.

As seen in FIG. 5, the bicycle operating device 10 further comprises an additional operating member 26. The additional operating member 26 is pivotally provided on one of the operating member 16 and the base member 12 about the additional pivot axis A2. In this embodiment, the additional operating member 26 is pivotally provided on the operating member 16. Specifically, the additional operating member 26 is pivotally coupled to the adapter 18 about the additional pivot axis A2. The operating shaft 24 pivotally couples the additional operating member 26 to the adapter 18 about the additional pivot axis A2.

The additional operating member 26 is pivotable relative to the base member 12 between a second rest position P31 and a second operated position P32. The additional operating member 26 is pivoted relative to the base member 12 from the second rest position P31 to the second operated position P32 in a second operating direction D21. The additional operating member 26 is pivoted relative to the base member 12 from the second operated position P32 toward the second rest position P31 in a second release direction D22 opposite to the second operating direction D21.

The second operating direction D21 and the second release direction D22 are defined along the circumferential direction defined about the additional pivot axis A2. The second operating direction D21 coincides with the first operating direction D11. The second release direction D22 coincides with the first release direction D12. However, the second operating direction D21 can be different from the first operating direction D11. The second release direction D22 can be different from the first release direction D12. In this embodiment, the additional operating member 26 is provided as an additional shift lever pivotable about the additional pivot axis A2. However, the additional operating member 26 is not limited to the additional shift lever. The additional operating member 26 can be omitted from the bicycle operating device 10.

As seen in FIG. 4, the bicycle operating device 10 comprises a hydraulic unit 28 provided on the base member 12. The hydraulic unit 28 includes a cylinder bore 30 and a piston 32 movably provided in the cylinder bore 30. In this embodiment, the base member 12 includes the cylinder bore 30. The cylinder bore 30 and the piston 32 define a hydraulic chamber 34. The hydraulic unit 28 includes a closing member 36 attached to the base member 12 to close an end of the cylinder bore 30. The cylinder bore 30, the piston 32, and the closing member 36 define the hydraulic chamber 34. The hydraulic chamber 34 is connected to the additional bicycle component BC2 with a fluid passageway (not shown) and the hydraulic hose C2 to supply a hydraulic pressure to the additional bicycle component BC2.

The piston 32 is movable relative to the cylinder bore 30 in response to a pivotal movement of the operating member 16. Specifically, the piston 32 is movable relative to the cylinder bore 30 between an initial position P41 and an actuated position P42. The initial position P41 corresponds to the rest position P11 of the operating member 16. The actuated position P42 corresponds to the operated position P12 of the operating member 16. Specifically, the piston 32 is at the initial position P41 in the rest state where the operating member 16 is at the rest position P11 (FIG. 1). The piston 32 is at the actuated position P42 in an operated state where the operating member 16 is at the operated position P12 (FIG. 1). The piston 32 is configured to be pushed from the initial position P41 to the actuated position P42 in response to the pivotal movement of the operating member 16 from the rest position P11 toward the operated position P12 to supply the hydraulic pressure to the additional bicycle component BC2.

Figure 6:
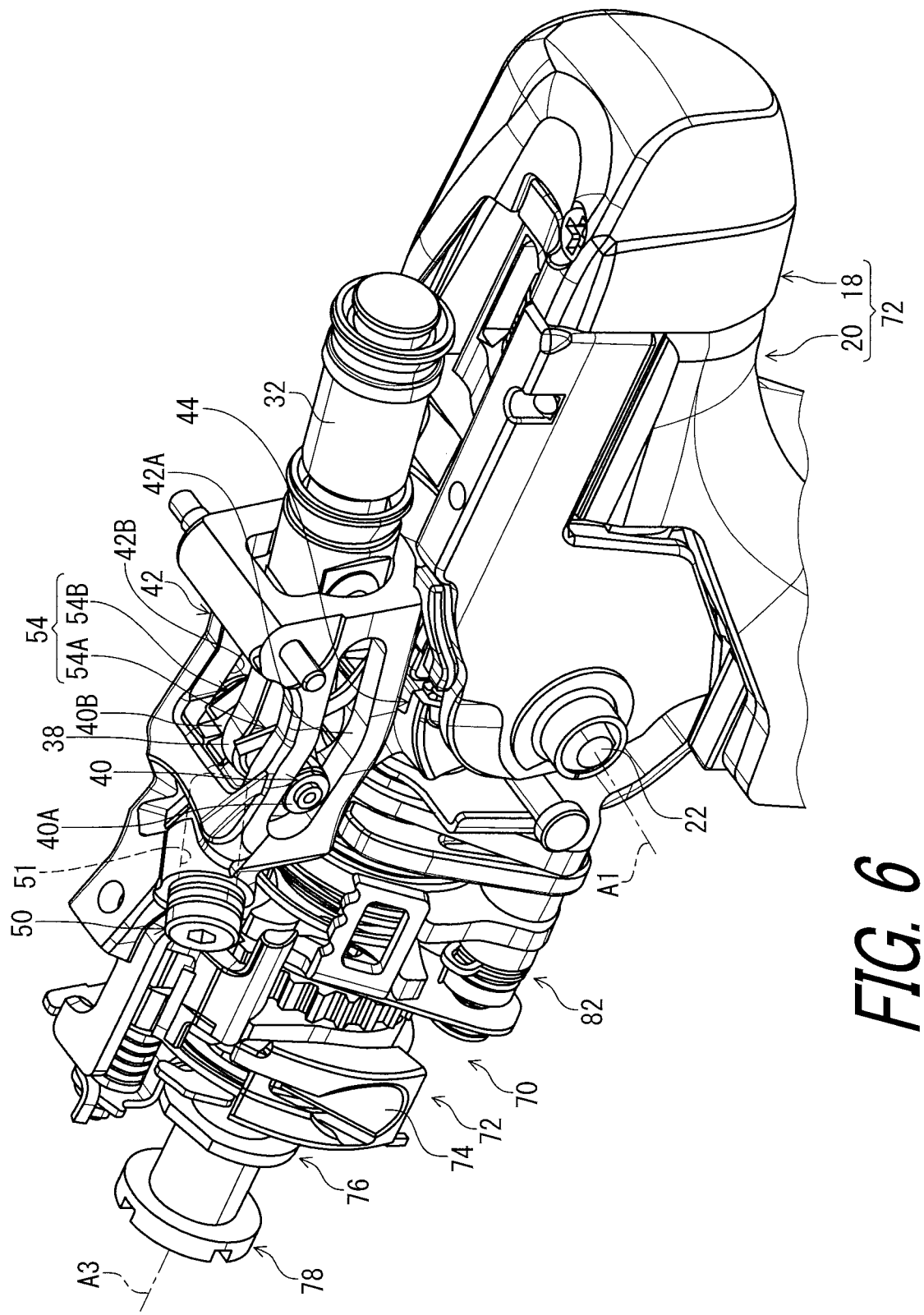
FIG. 6 is a perspective view of an internal structure of the bicycle operating device illustrated in FIG. 1.
Figure 7:
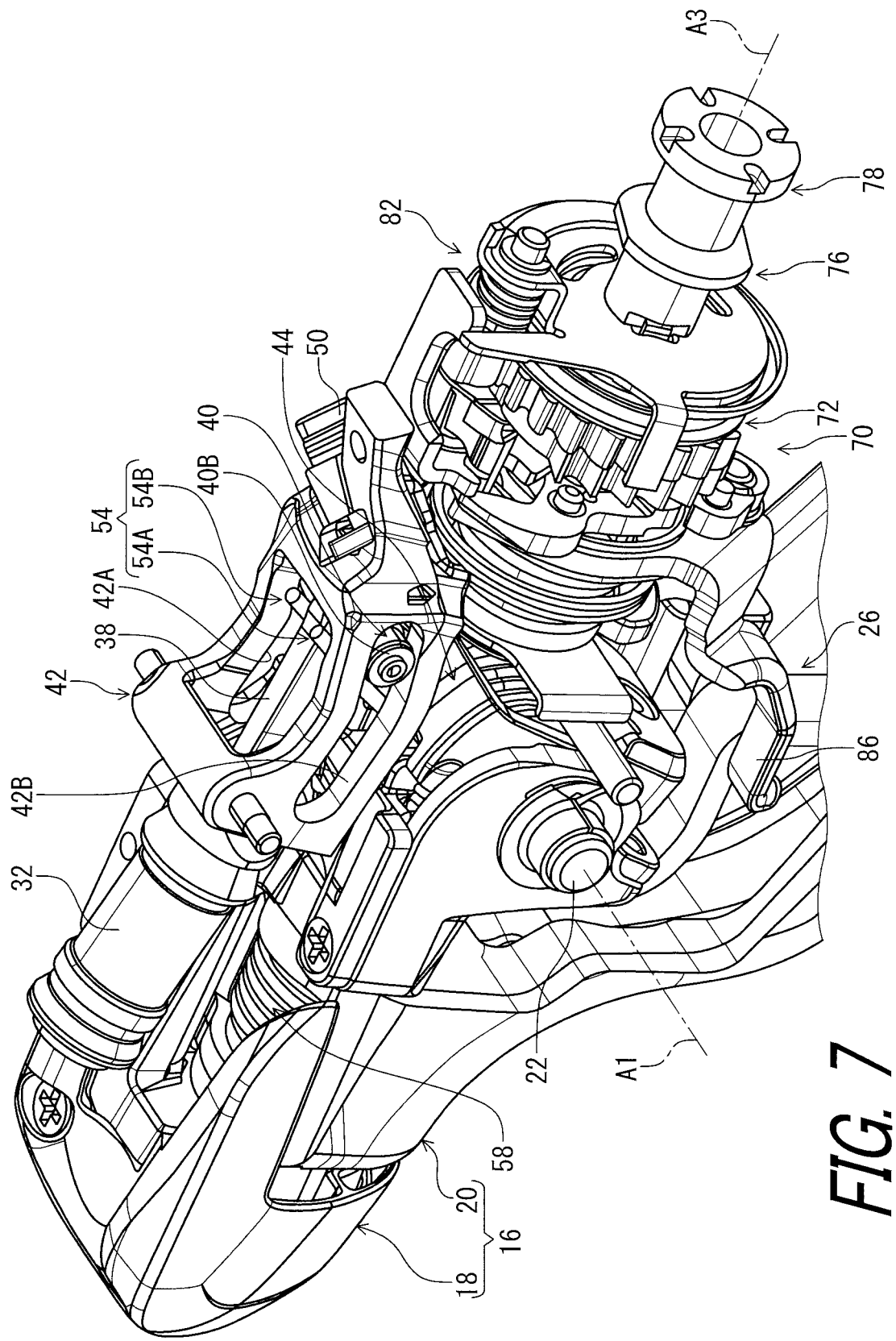
FIG. 7 is another perspective view of the internal structure of the bicycle operating device illustrated in FIG. 1.

As seen in FIGS. 4, 6, and 7, the bicycle operating device 10 comprises a piston rod 38, a guide pin 40, a guide member 42, and a transmitting member 44. The piston rod 38 operatively couples the piston 32 to the guide pin 40. As seen in FIG. 4, the guide member 42 is detachably attached to the base member 12 with a screw 45. As seen in FIGS. 6 and 7, the guide member 42 includes a pair of guide grooves 42A and 42B. Ends 40A and 40B of the guide pin 40 are movably provided in the guide grooves 42A and 42B, respectively.

Figure 8:
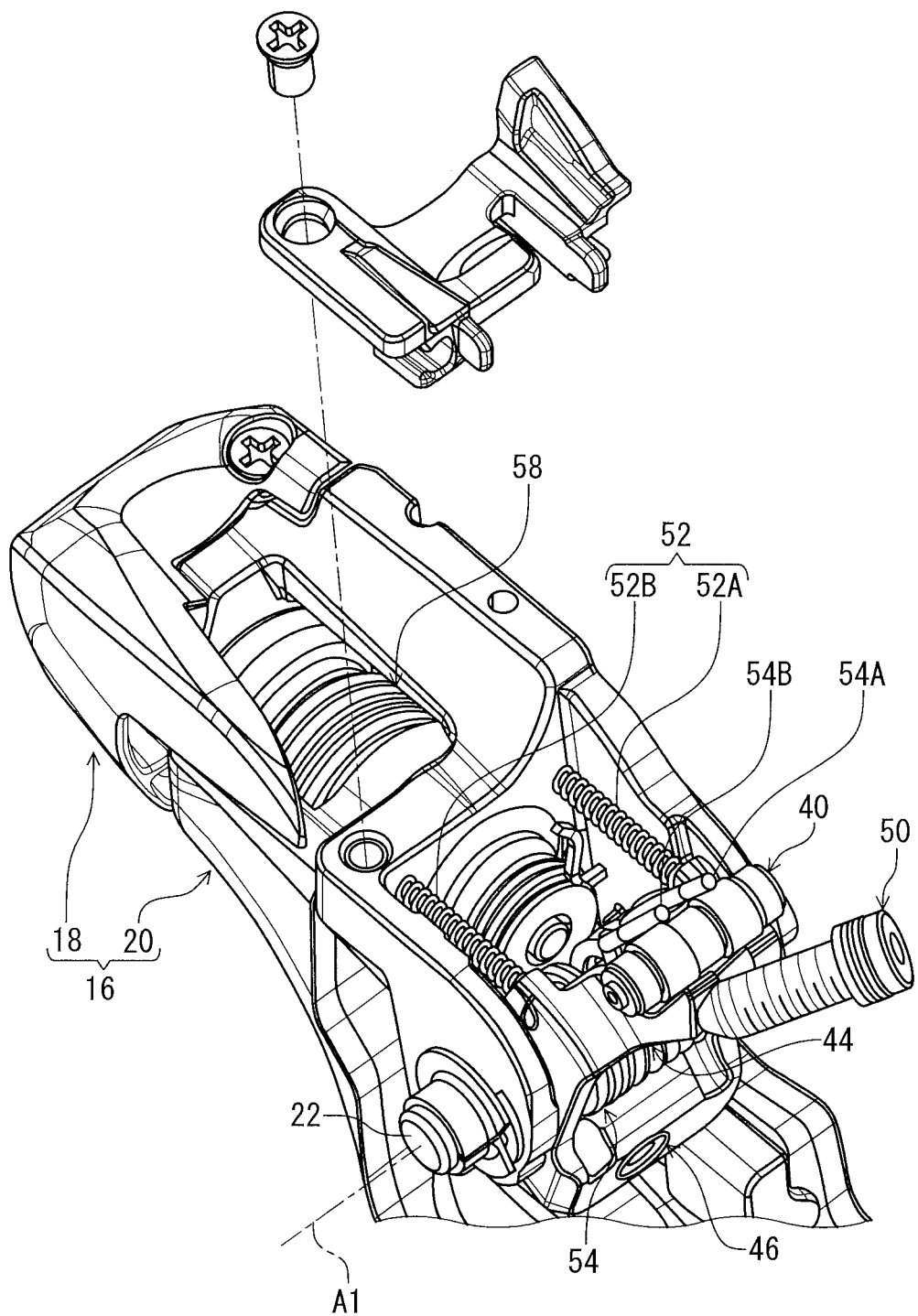
FIG. 8 is a partial cross-sectional view of the bicycle operating device illustrated in FIG. 1.

As seen in FIG. 8, the transmitting member 44 is pivotally coupled to the base member 12 with the pivot shaft 22. The transmitting member 44 is in contact with the guide pin 40. The transmitting member 44 is pivotable relative to the base member 12 about the pivot axis A1 to transmit the pivotal movement of the operating member 16 to the guide pin 40.

As seen in FIG. 4, the bicycle operating device 10 comprises an adjustment member 46 and a receiving member 48. The adjustment member 46 is attached to one of the transmitting member 44 and the operating member 16 to change the rest position P11 of the operating member 16 relative to the base member 12. The receiving member 48 is provided to the other of the transmitting member 44 and the operating member 16 to be movable with the adjustment member 46 in response to the pivotal movement of the operating member 16 relative to the base member 12. In this embodiment, the adjustment member 46 is attached to the transmitting member 44, and the receiving member 48 is provided to the operating member 16. However, the adjustment member 46 can be attached to the operating member 16, and the receiving member 48 can be provided to the transmitting member 44.

Figure 9:
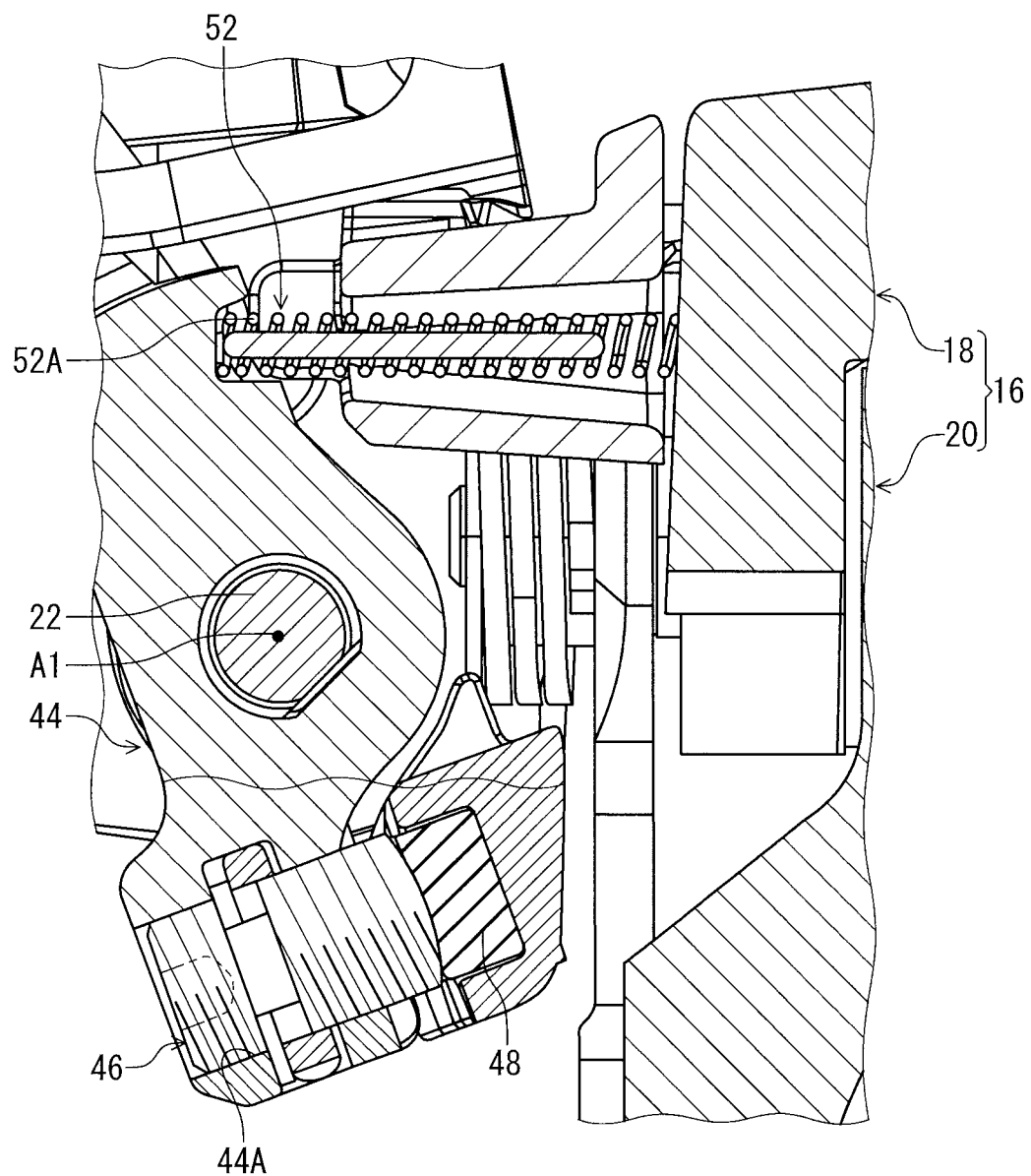
FIG. 9 is an exploded perspective view of an internal structure of the bicycle operating device illustrated in FIG. 1.

As seen in FIG. 9, for example, the adjustment member 46 includes an adjustment screw. The transmitting member 44 includes a first adjustment threaded hole 44A. The adjustment member 46 is threadedly engaged with the first adjustment threaded hole 44A. An end of the adjustment member 46 is in contact with the receiving member 48.

As seen in FIG. 6, the bicycle operating device 10 comprises an additional adjustment member 50 to change the initial position P41 (FIG. 4) of the piston 32 relative to the base member 12. In this embodiment, the additional adjustment member 50 includes an adjustment screw mounted to the guide member 42. The additional adjustment member 50 is threadedly engaged with a second adjustment threaded hole 51 (FIG. 6) of the guide member 42. As seen in FIG. 8, an end of the additional adjustment member 50 is in contact with the transmitting member 44.

As seen in FIGS. 8 and 9, the bicycle operating device 10 comprises a first biasing member 52 provided between the operating member 16 and the transmitting member 44 to bias the adjustment member 46 toward the receiving member 48. In this embodiment, as seen in FIG. 8, the first biasing member 52 includes first biasing parts 52A and 52B. For example, each of the first biasing parts 52A and 52B include a coiled spring. As seen in FIG. 9, the first biasing member 52 is provided on an opposite side of the adjustment member 46 and the receiving member 48 relative to the pivot axis A1 as viewed along the pivot axis A1. The first biasing member 52 is provided on an opposite side of the adjustment member 46 and the receiving member 48 relative to the pivot axis A1 as viewed along the pivot axis A1.

Figure 10:
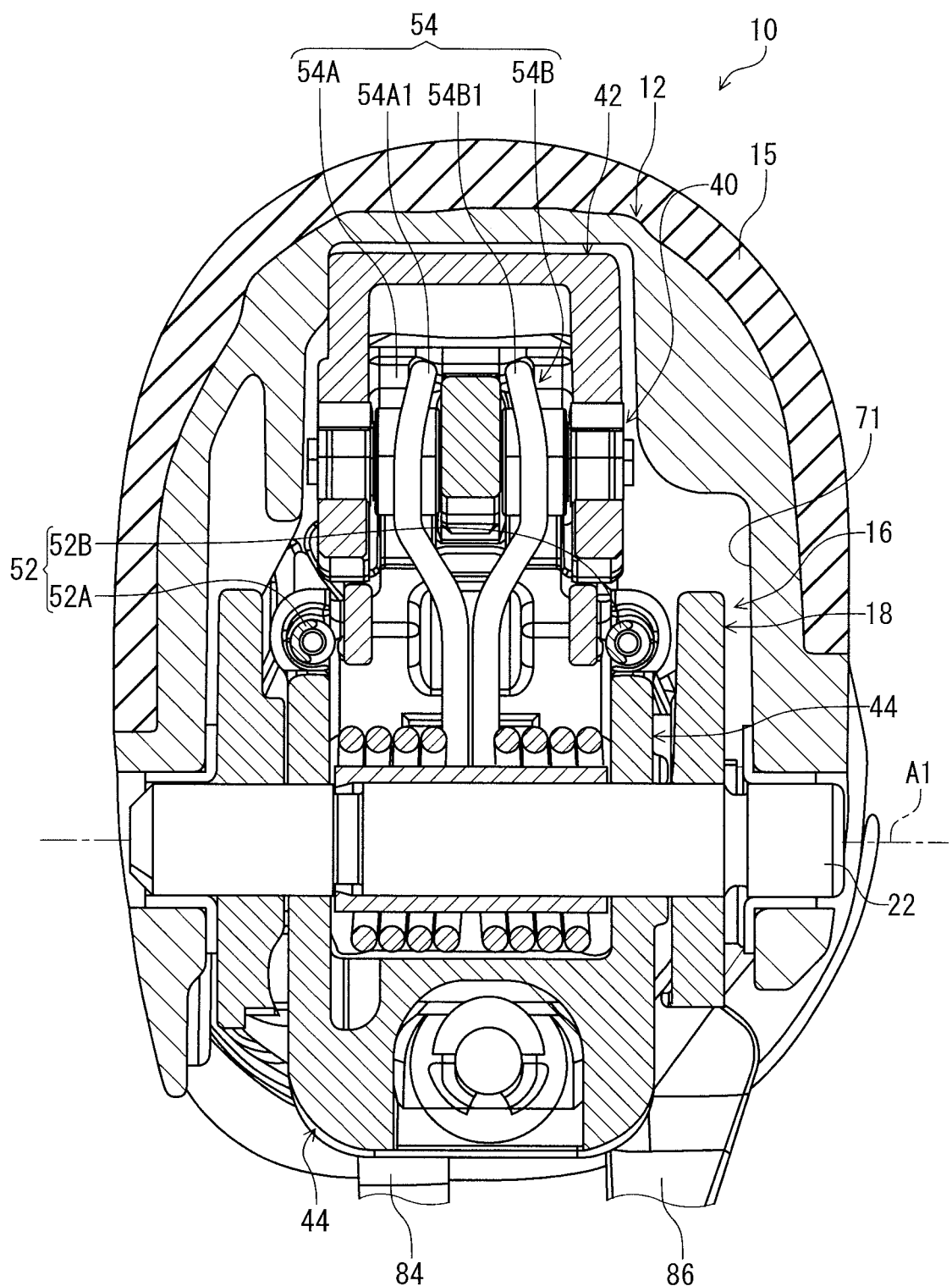
FIG. 10 is a cross-sectional view of the bicycle operating device taken along line X-X of FIG. 4.

As seen in FIG. 10, the bicycle operating device 10 comprises a second biasing member 54 to bias the operating member 16 toward the rest position P11 (FIG. 1) relative to the base member 12. The second biasing member 54 is mounted on the pivot shaft 22. In this embodiment, the second biasing member 54 includes a torsion spring. The second biasing member 54 includes a second biasing parts 54A and 54B. For example, each of the second biasing parts 54A and 54B include a coiled spring. The second biasing parts 54A and 54B are mounted on the pivot shaft 22. A first end 54A1 of the second biasing part 54A is in contact with the guide pin 40. A first end 54B1 of the second biasing part 54B is in contact with the guide pin 40.

Figure 11:
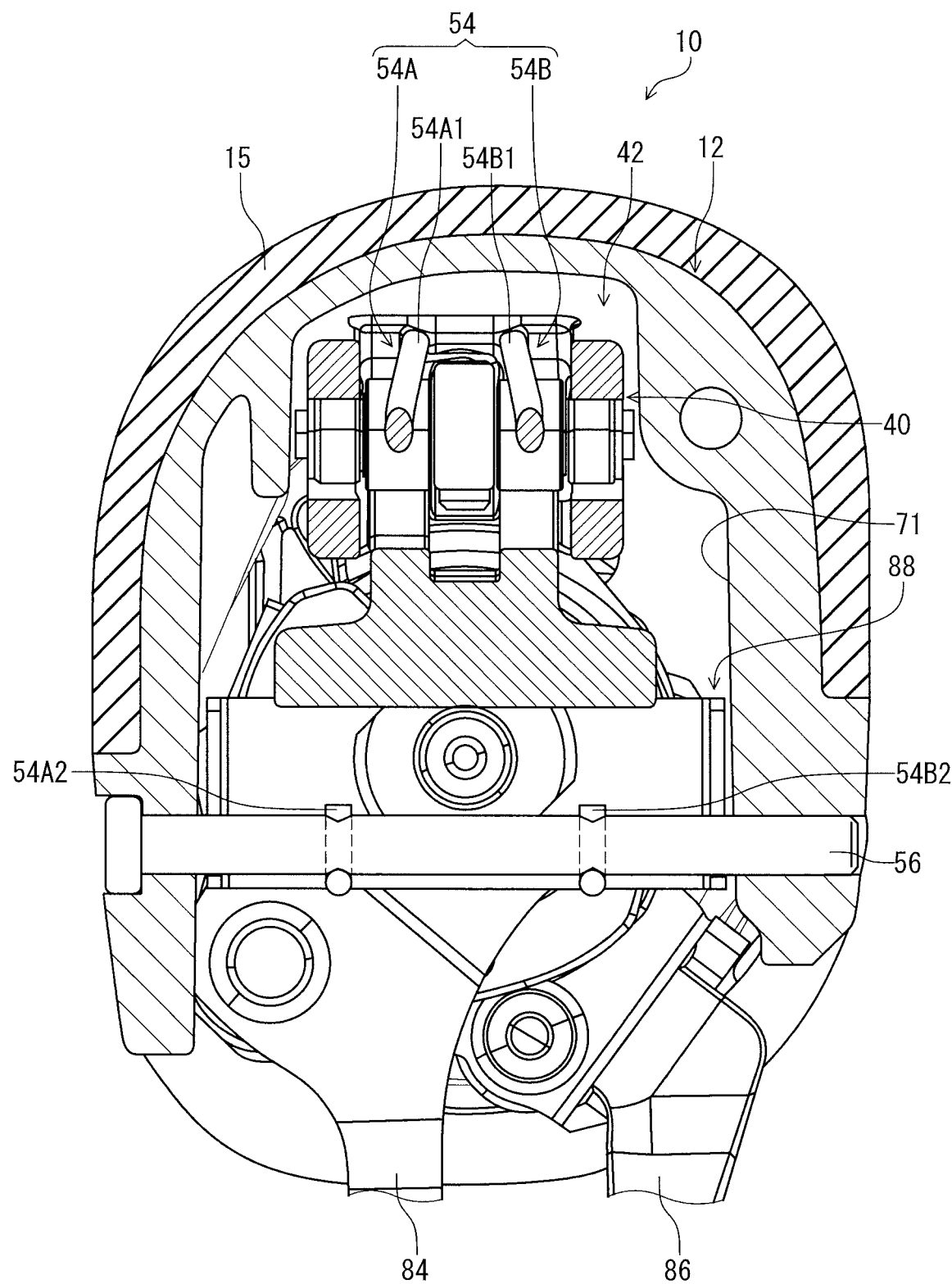
FIG. 11 is a cross-sectional view of the bicycle operating device taken along line XI-XI of FIG. 4.

As seen in FIG. 11, the bicycle operating device 10 comprises a support rod 56 secured to the base member 12. A second end 54A2 of the second biasing part 54A is received by the support rod 56. A second end 54B2 of the second biasing part 54B is received by the support rod 56.

As seen in FIG. 8, the transmitting member 44 is pressed by the second biasing member 54 against the additional adjustment member 50. The additional adjustment member 50 and the second biasing member 54 position the operating member 16 at the rest position P11 (FIG. 1). Furthermore, the second biasing member 54 biases the piston 32 toward the initial position P41 (FIG. 4). The additional adjustment member 50 and the second biasing member 54 position the piston 32 at the initial position P41 (FIG. 4).

As seen in FIG. 4, rotation of the adjustment member 46 relative to the transmitting member 44 changes a position of the operating member 16 relative to the transmitting member 44. This changes the rest position P11 of the operating member 16 without changing the initial position P41 of the piston 32. Rotation of the additional adjustment member 50 changes a position of the transmitting member 44 relative to the base member 12. This changes the initial position P41 of the piston 32 and further changes the rest position P11 of the operating member 16.

The bicycle operating device 10 comprises a third biasing member 58 to bias the operating lever 20 toward the first rest position P21 (FIG. 3) relative to the adapter 18. The third biasing member 58 is mounted on the operating shaft 24. For example, the third biasing member 58 includes a torsion spring.

Figure 12:
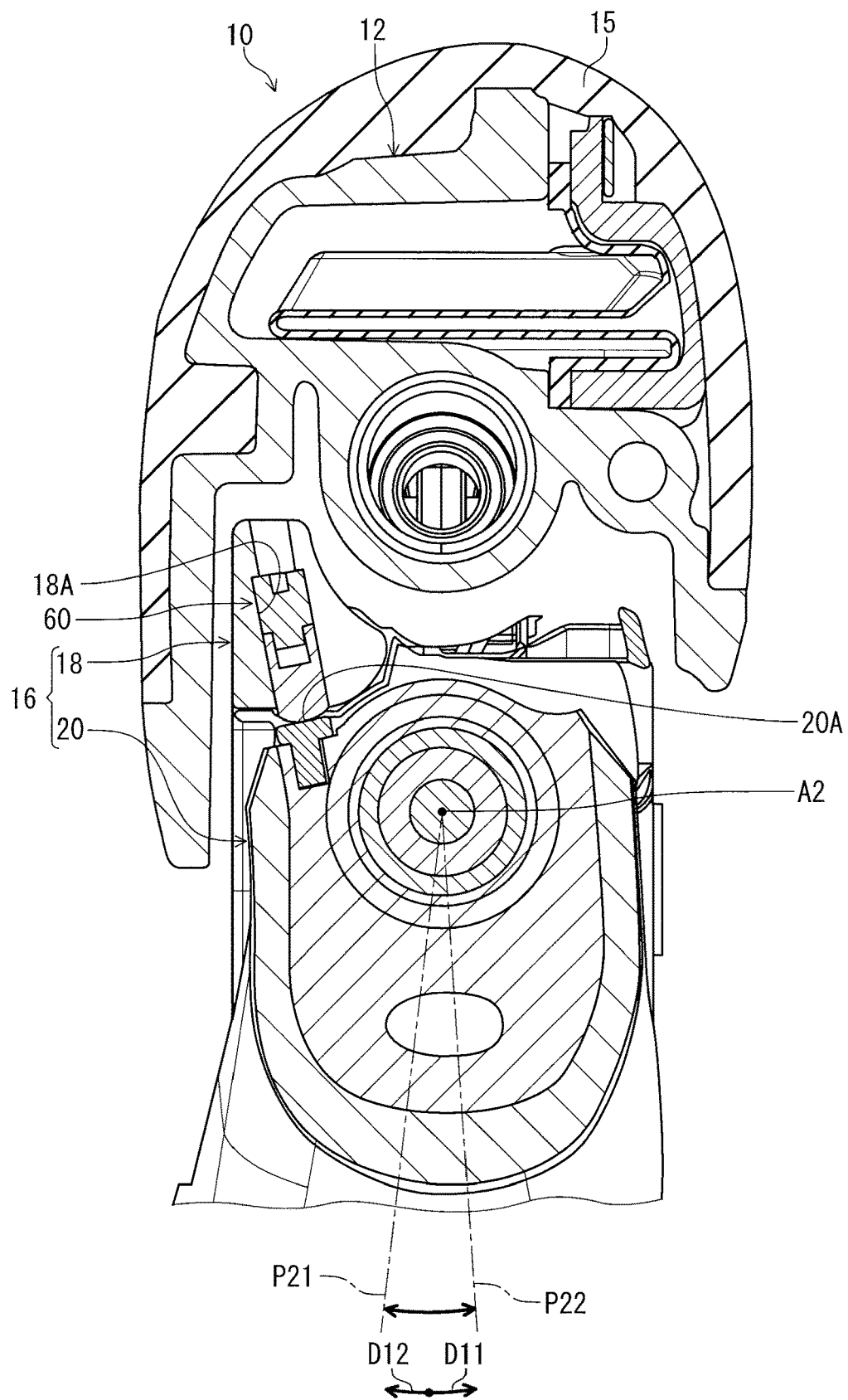
FIG. 12 is a cross-sectional view of the bicycle operating device taken along line XII-XII of FIG. 4.

As seen in FIG. 12, the adapter 18 positions the operating lever 20 at the first rest position P21. In this embodiment, the bicycle operating device 10 comprises an adjustment part 60 attached to the adapter 18 to change the first rest position P21 of the operating member 16 relative to the base member 12. The adjustment part 60 is in contact with a stopper surface 20A of the operating lever 20 to position the operating lever 20 at the first rest position P21. The adapter 18 includes a threaded-hole 18A threadedly engaged with the adjustment part 60. Rotation of the adjustment part 60 changes the first rest position P21 of the operating lever 20 relative to the adapter 18.

As seen in FIG. 4, the bicycle operating device 10 comprises a fourth biasing member 62 to bias the additional operating member 26 toward the second rest position P31 (FIG. 5) relative to the base member 12. In this embodiment, the fourth biasing member 62 biases the additional operating member 26 toward the second rest position P31 (FIG. 5) relative to the operating member 16 (the adapter 18). The fourth biasing member 62 is mounted on the operating shaft 24. For example, the fourth biasing member 62 includes a torsion spring. As seen in FIG. 5, the operating member 16 (the operating lever 20) is in contact with the additional operating member 26 to position the additional operating member 26 at the second rest position P31.

Figure 13:
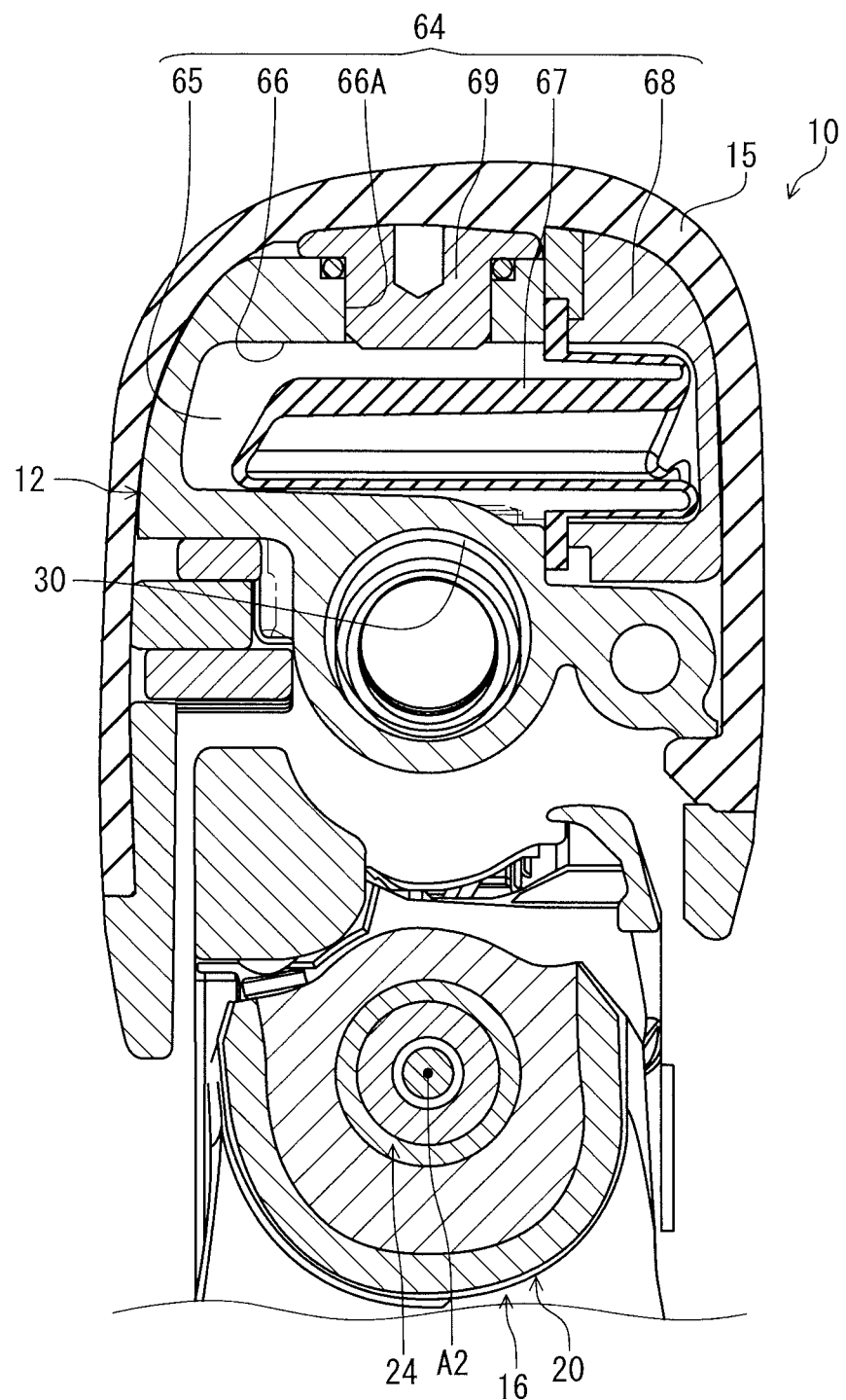
FIG. 13 is a cross-sectional view of the bicycle operating device taken along line XIII-XIII of FIG. 4.

As seen in FIG. 13, the hydraulic unit 28 comprises a hydraulic reservoir 64. The hydraulic reservoir 64 includes a reservoir chamber 65 connected to the hydraulic chamber 34. As seen in FIG. 4, the hydraulic reservoir 64 is provided at the first end portion 12A. In this embodiment, the hydraulic reservoir 64 is provided at the pommel portion 12E.

As seen in FIG. 13, the hydraulic reservoir 64 includes a reservoir recess 66, a diaphragm 67, and a lid 68. In this embodiment, the base member 12 includes the reservoir recess 66. The diaphragm 67 is at least partly disposed in the reservoir recess 66. The reservoir recess 66 and the diaphragm 67 define the reservoir chamber 65 in the reservoir recess 66. In this embodiment, the hydraulic reservoir 64 includes a bleed member 69. The base member 12 includes a bleeding hole 66A. The bleed member 69 is detachably attached to the base member 12 to close the bleeding hole 66A. The reservoir recess 66, the diaphragm 67, and the bleed member 69 define the reservoir chamber 65 in the reservoir recess 66. The reservoir chamber 65 is connected to the hydraulic chamber 34 via at least one connection holes (not shown). The hydraulic reservoir 64 can be omitted from the bicycle operating device 10.

Figure 14:
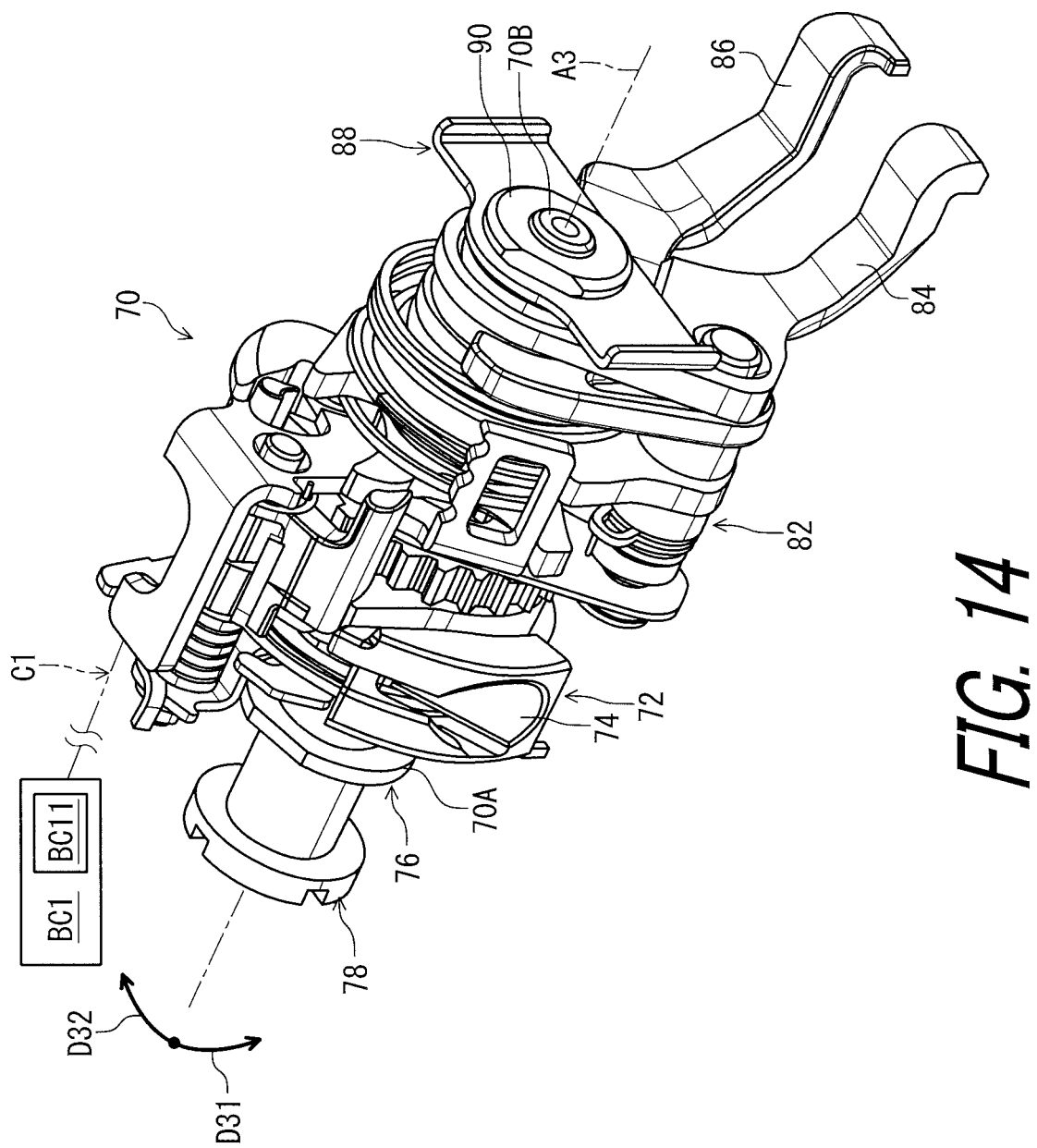
FIG. 14 is a perspective view of an operating structure and a support plate of the bicycle operating device illustrated in FIG. 1.

As seen in FIGS. 4 and 14, the bicycle operating device 10 comprises an operating structure 70. The operating structure 70 is provided between the first end portion 12A and the second end portion 12B. The operating structure 70 is provided in an accommodation space 71 of the base member 12. The operating structure 70 includes a rotatable member 72 rotatable relative to the base member 12 (FIG. 4) about a rotational axis A3 to control the bicycle component BC1. The rotatable member 72 is rotatable relative to the base member 12 (FIG. 4) about the rotational axis A3 to operate the shift device BC11. The rotatable member 72 is operatively coupled to the bicycle component BC1 with the control cable C1. However, the rotatable member 72 can be configured to control another bicycle component such as the adjustable seatpost assembly and the bicycle suspension.

As seen in FIG. 14, the rotatable member 72 includes a cable attachment part 74. An end of the control cable C1 is attached to the cable attachment part 74. However, the rotatable member 72 can be coupled to another control element. The rotatable member 72 is rotatable relative to the base member 12 about the rotational axis A3 in a first rotational direction D31 to wind the control cable C1. The rotatable member 72 is rotatable relative to the base member 12 about the rotational axis A3 in a second rotational direction D32 to unwind (release) the control cable C1. The second rotational direction D32 is opposite to the first rotational direction D31.

Figure 15:
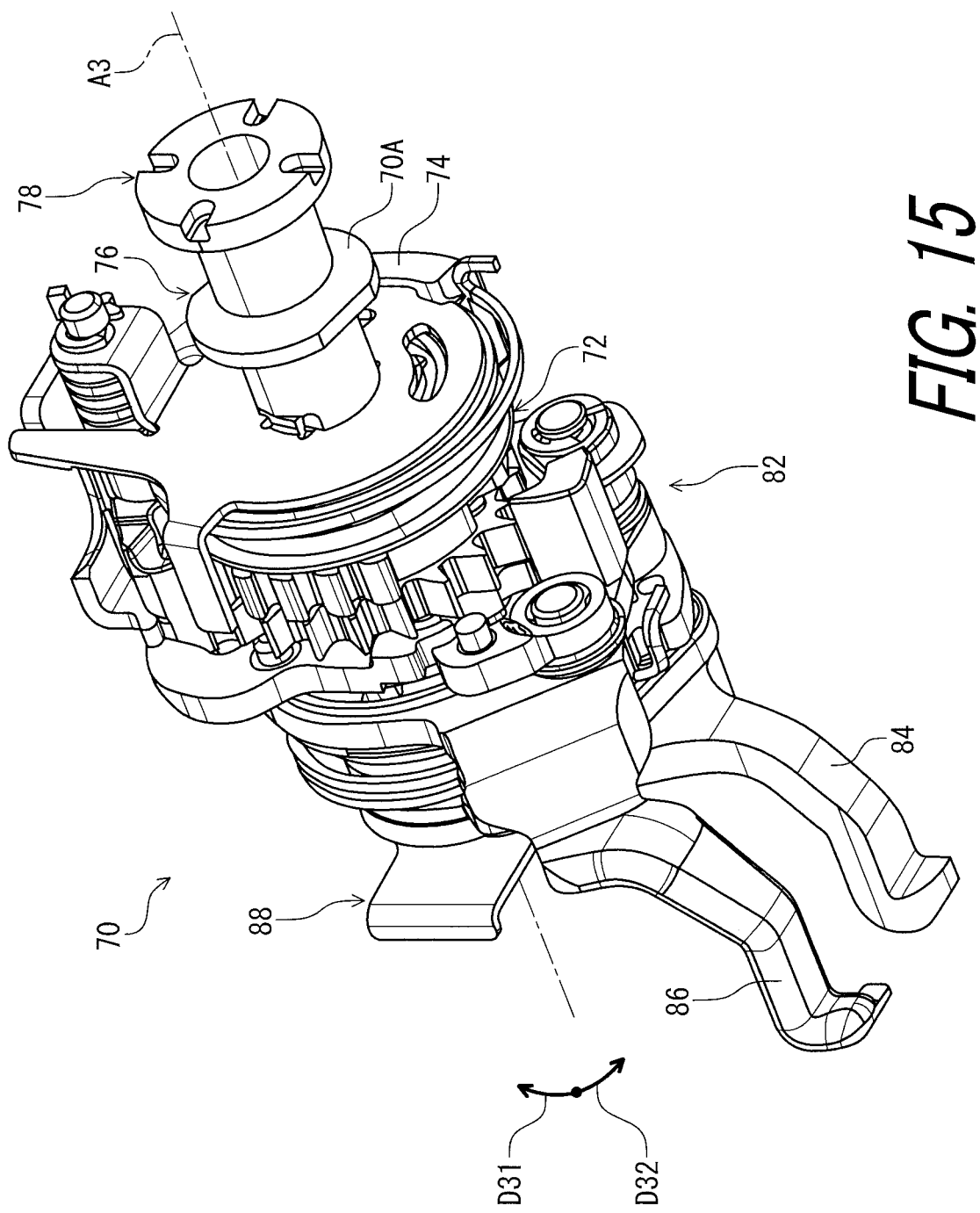
FIG. 15 is another perspective view of the operating structure and the support plate of the bicycle operating device illustrated in FIG. 1.

As seen in FIGS. 14 and 15, the operating structure 70 includes a first axial end 70A and a second axial end 70B. The second axial end 70B is opposite to the first axial end 70A along the rotational axis A3. The operating structure 70 includes a rotational shaft 76 rotatably supporting the rotatable member 72 about the rotational axis A3. The rotational shaft 76 includes the first axial end 70A and the second axial end 70B and extends between the first axial end 70A and the second axial end 70B. The rotational shaft 76 defines the rotational axis A3.

Figure 16:
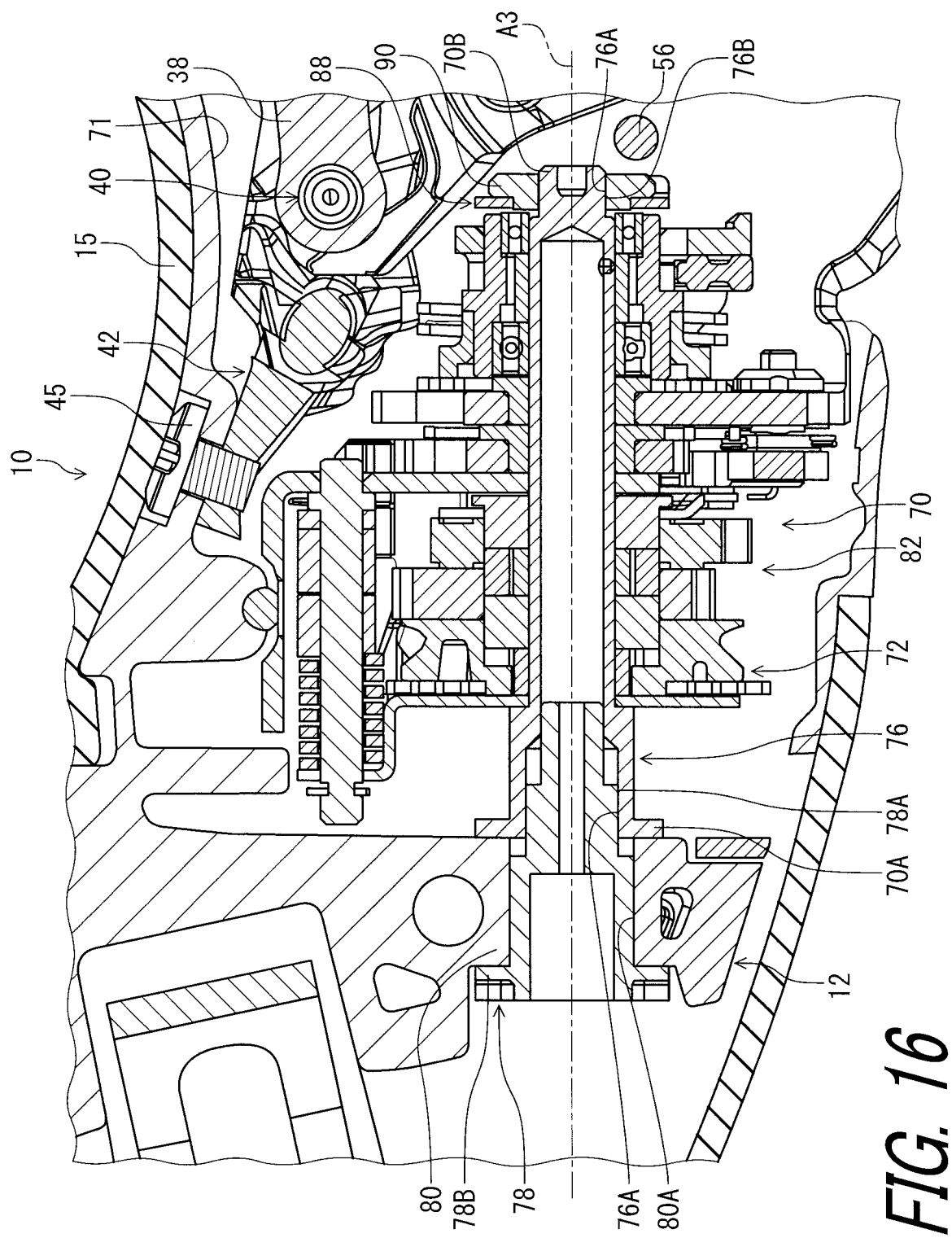
FIG. 16 is an enlarged cross-sectional view of the bicycle operating device illustrated in FIG. 4.

As seen in FIG. 16, the first axial end 70A is secured to the base member 12. The bicycle operating device 10 comprise a securing member 78 securing the rotational shaft 76 to the base member 12. The base member 12 includes a support wall 80 having a support hole 80A. The securing member 78 extends through the support hole 80A. The securing member 78 is coupled to the first axial end 70A of the rotational shaft 76. Specifically, the rotational shaft 76 includes a threaded hole 76A provided at the first axial end 70A. The securing member 78 includes an externally threaded part 78A threadedly engaged with the threaded hole 76A of the rotational shaft 76. The securing member 78 includes a flange 78B. The support wall 80 is held between the flange 78B and the first axial end 70A.

Figure 17:
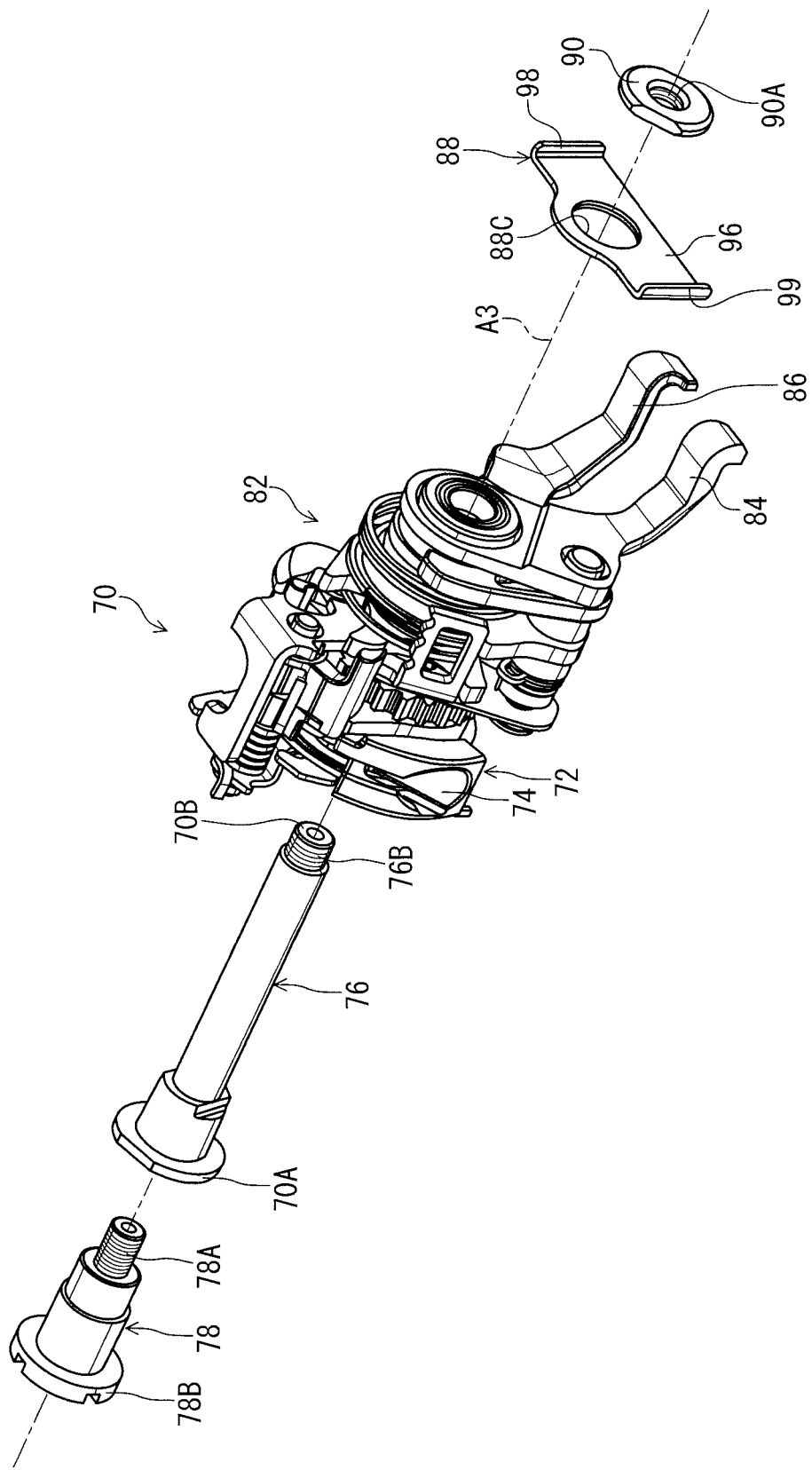
FIG. 17 is an exploded perspective view of the operating structure and the support plate of the bicycle operating device illustrated in FIG. 1.

As seen in FIG. 17, the operating structure 70 includes a positioning structure 82 configured to position the rotatable member 72 at one of rotational positions selectively. The positioning structure 82 is mounted to the rotational shaft 76. As seen in FIG. 16, the positioning structure 82 is provided between the first axial end 70A and the second axial end 70B.

Figure 18:
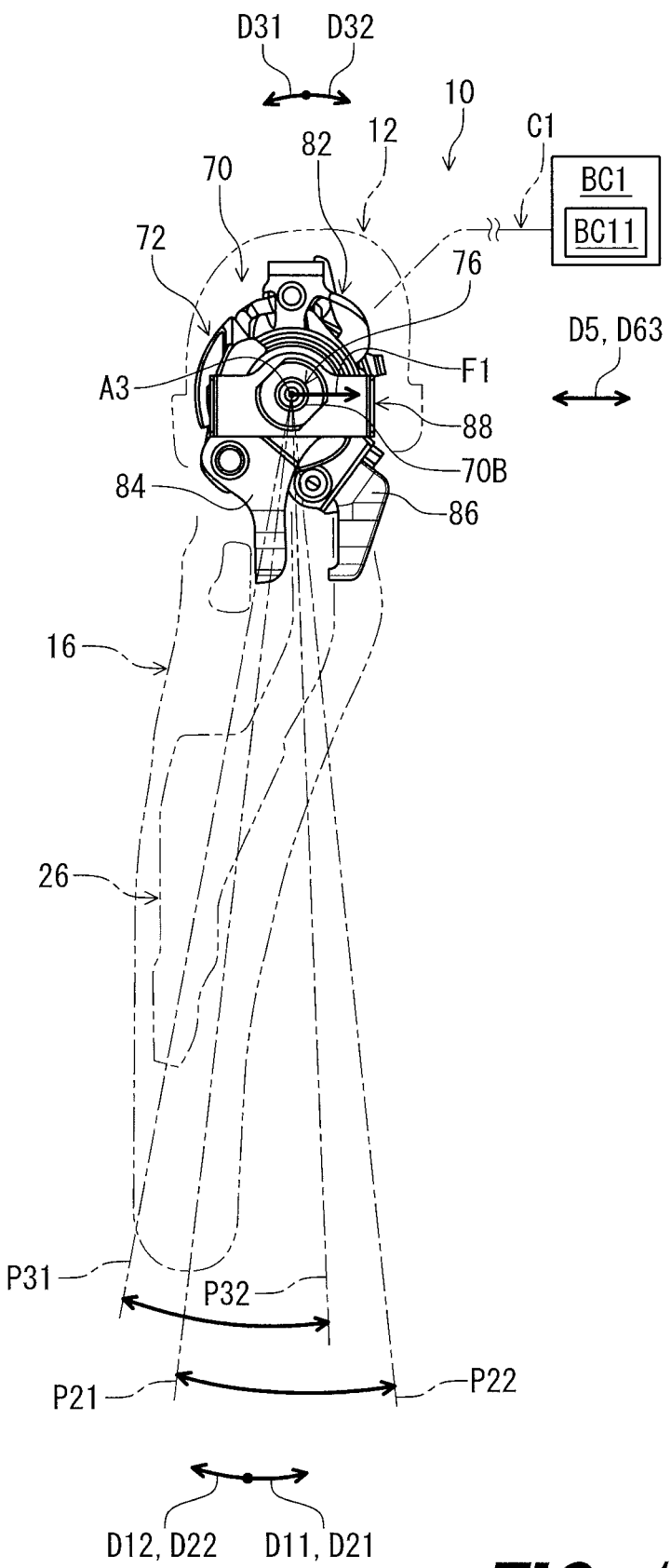
FIG. 18 is a front view of the operating structure and the support plate of the bicycle operating device illustrated in FIG. 1.

As seen in FIG. 18, the positioning structure 82 is configured to rotate the rotatable member 72 relative to the base member 12 about the rotational axis A3 by a rotational angle in the first rotational direction D31 in response to a pivotal movement of the operating member 16 from the first rest position P21 to the first operated position P22. The positioning structure 82 is configured to rotate the rotatable member 72 relative to the base member 12 about the rotational axis A3 by the rotational angle in the second rotational direction D32 in response to a pivotal movement of the additional operating member 26 from the second rest position P31 to the second operated position P32.

The bicycle operating device 10 comprises a first intermediate member 84 and a second intermediate member 86. The first intermediate member 84 and the second intermediate member 86 are pivotally mounted to the rotational shaft 76. The first intermediate member 84 is pivotable relative to the base member 12 about the rotational axis A3 to transmit a pivotal movement of the operating member 16 to the positioning structure 82. The second intermediate member 86 is pivotable relative to the base member 12 about the rotational axis A3 to transmit a pivotal movement of the additional operating member 26 to the positioning structure 82. The additional operating member 26, the first intermediate member 84, and the second intermediate member 86 are pivoted relative to the base member 12 about the rotational axis A3 in response to the pivotal movement of the operating member 16. The second intermediate member 86 is pivoted relative to the base member 12 about the rotational axis A3 in response to the pivotal movement of the additional operating member 26. Since the positioning structure 82 has been known in the bicycle field, it will not be described in detail here for the sake of brevity.

Figure 19:
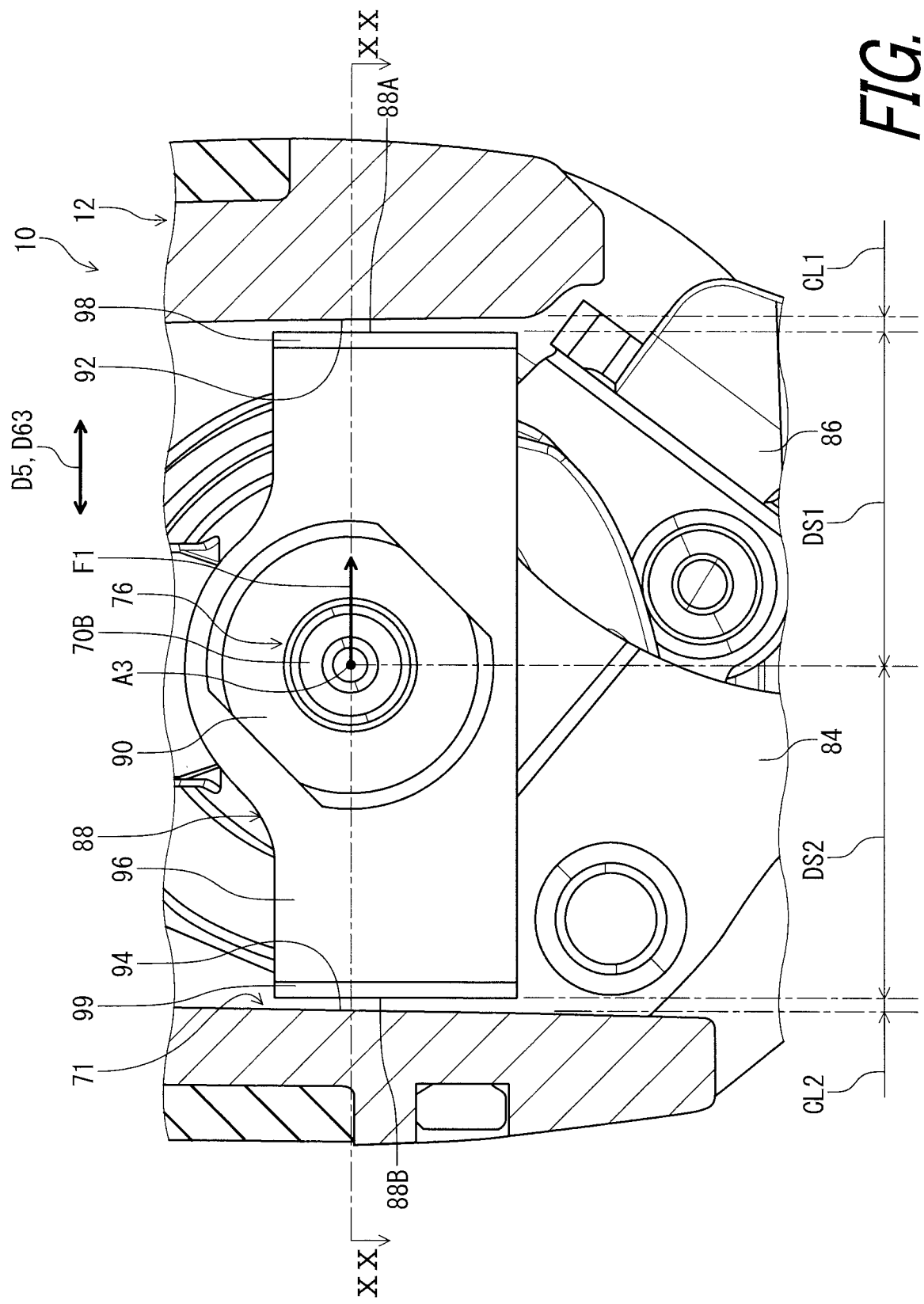
FIG. 19 is a cross-sectional view of the bicycle operating device taken along line XIX-XIX of FIG. 4.
Figure 20:
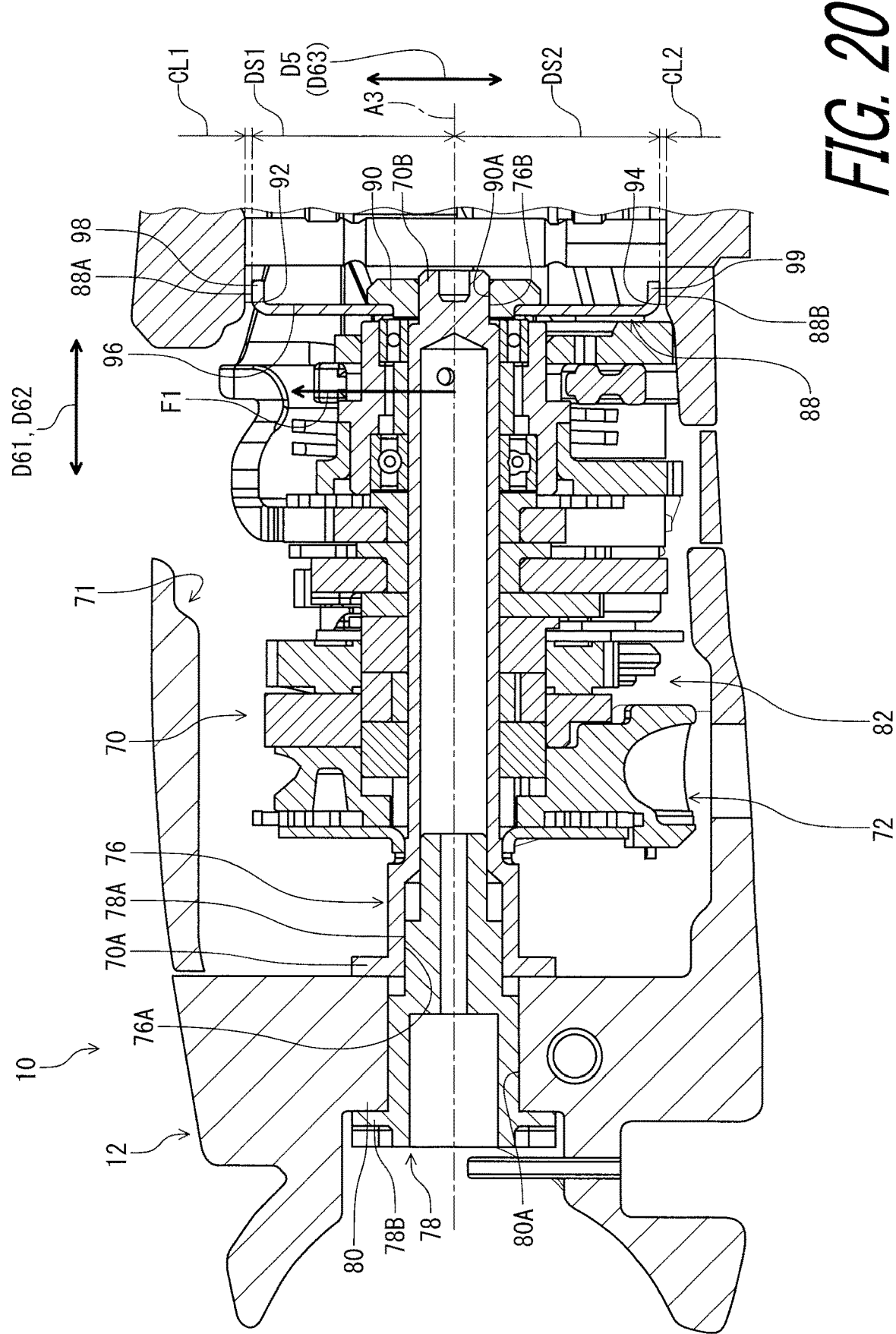
FIG. 20 is a cross-sectional view of the bicycle operating device taken along line XX-XX of FIG. 19.

As seen in FIGS. 19 and 20, the bicycle operating device 10 comprises a support plate 88 attached to the second axial end 70B. The support plate 88 is attached to the second axial end 70B to be movable relative to the base member 12. In this embodiment, the support plate 88 is secured to the second axial end 70B to be movable relative to the base member 12. The operating structure 70 includes a coupling member 90 coupling the support plate 88 to the second axial end 70B of the rotational shaft 76. In this embodiment, as seen in FIGS. 17 and 20, the support plate 88 includes an opening 88C. The rotational shaft 76 extends through the opening 88C of the support plate. The rotational shaft 76 includes an externally threaded part 76B provided at the second axial end 70B. The coupling member 90 includes a coupling threaded hole 90A threadedly engaged with the externally threaded part 78A of the rotational shaft 76.

As seen in FIGS. 19 and 20, the second axial end 70B and the support plate 88 are provided in the base member 12 without being secured to the base member 12. In other words, the rotational shaft 76 is a cantilever shaft that is secured to the base member 12 at the first axial end 70A. The support plate 88 is contactable with the base member 12. The base member 12 includes a first inner surface 92. The support plate 88 includes a first support surface 88A facing the first inner surface 92. The first support surface 88A faces the first inner surface 92 in a facing direction D5 different from a direction parallel to the rotational axis A3. In this embodiment, the facing direction D5 is perpendicular to the rotational axis A3. However, the facing direction D5 is not limited to this embodiment. The facing direction D5 can be non-perpendicular to the rotational axis A3.

The first support surface 88A is contactable with the first inner surface 92. The first support surface 88A is spaced apart from the first inner surface 92 in a rest state where the operating member 16 and the additional operating member 26 are not operated by the user.

A first clearance CL1 is defined between the first support surface 88A of the support plate 88 and the first inner surface 92 of the base member 12. The first clearance CL1 is defined between the first support surface 88A of the support plate 88 and the first inner surface 92 of the base member 12 in the facing direction D5. The first clearance CL1 is defined as a minimum clearance between the first support surface 88A of the support plate 88 and the first inner surface 92 of the base member 12. In this embodiment, the first clearance CL1 is equal to or smaller than 5 mm. The first clearance CL1 is preferably equal to or smaller than 1 mm. However, the first clearance CL1 is not limited to this embodiment. The first support surface 88A of the support plate 88 can be disposed to be in contact with the first inner surface 92 of the base member 12 in a rest state where an operating force is not applied to the operating member 16 and the additional operating member 26. Namely, the first clearance CL1 can be 0 mm.

As seen in FIGS. 19 and 20, the base member 12 includes a second inner surface 94. The support plate 88 includes a second support surface 88B facing the second inner surface 94. The second support surface 88B faces the second inner surface 94 in the facing direction D5. The second support surface 88B is contactable with the second inner surface 94. The second support surface 88B is spaced apart from the second inner surface 94 in the rest state where the operating member 16 and the additional operating member 26 are not operated by the user.

A second clearance CL2 is defined between the second support surface 88B of the support plate 88 and the second inner surface 94 of the base member 12. The second clearance CL2 is defined as a minimum clearance between the second support surface 88B of the support plate 88 and the second inner surface 94 of the base member 12. In this embodiment, the second clearance CL2 is equal to or smaller than 5 mm. The second clearance CL2 is preferably equal to or smaller than 1 mm. However, the second clearance CL2 is not limited to this embodiment. The second support surface 88B of the support plate 88 can be disposed to be in contact with the second inner surface 94 of the base member 12 in the rest state where the operating member 16 and the additional operating member 26 are not operated by the user. Namely, the second clearance CL2 can be 0 mm.

The rotational axis A3 is provided between the first support surface 88A and the second support surface 88B as viewed along the rotational axis A3. In this embodiment, the rotational axis A3 is provided at a middle position between the first support surface 88A and the second support surface 88B as viewed along the rotational axis A3. A first minimum distance DS1 defined between the rotational axis A3 and the first support surface 88A is equal to a second minimum distance DS2 defined between the rotational axis A3 and the second support surface 88B. However, the first minimum distance DS1 can be different from the second minimum distance DS2.

As seen in FIGS. 19 and 20, the support plate 88 includes a base part 96, a first part 98, and a second part 99. The base part 96 is attached to the second axial end 70B of the operating structure 70. In this embodiment, the base part 96 is secured to the second axial end 70B of the operating structure 70 with the coupling member 90. The first part 98 extends from the base part 96 along the first inner surface 92. The first support surface 88A is provided on the first part 98. The second part 99 extends from the base part 96 along the second inner surface 94. The second support surface 88B is provided on the second part 99.

As seen in FIG. 20, the first part 98 extends from the base part 96 in a first direction D61. The second part 99 extends from the base part 96 in a second direction D62. The base part 96 extends from the second axial end 70B in a third direction D63 different from each of the first direction D61 and the second direction D62. At least one of the first direction D61 and the second direction D62 is parallel to the rotational axis A3. In this embodiment, the first direction D61 and the second direction D62 are parallel to the rotational axis A3. The third direction D63 is perpendicular to the rotational axis A3. The third direction D63 coincides with the facing direction D5. However, the first direction D61, the second direction D62, and the third direction D63 are not limited to this embodiment. At least one of the first direction D61 and the second direction D62 can be non-parallel to the rotational axis A3. The third direction D63 can be non-perpendicular to the rotational axis A3.

At least one of the first support surface 88A and the second support surface 88B faces in the third direction D63. In this embodiment, the first support surface 88A and the second support surface 88B face in the third direction D63. However, a direction in which the first support surface 88A faces is not limited to this embodiment, and a direction in which the second support surface 88B is not limited to this embodiment.

As seen in FIG. 18, a force F1 is applied to the second axial end 70B of the operating structure 70 when the operating member 16 is operated relative to the base member 12 from the first rest position P21 to the first operated position P22 in the first operating direction D11. In this embodiment, the force F1 is transmitted from the first intermediate member 84 to the second axial end 70B. As seen in FIGS. 19 and 20, the support plate 88 comes into contact with the first inner surface 92 of the base member 12 when the force F1 is applied to the second axial end 70B of the operating structure 70. The force F1 is received by the base member 12 even though the second axial end 70B and the support plate 88 are not secured to the base member 12.

Second Embodiment

A bicycle operating device 210 in accordance with a second embodiment will be described below referring to FIGS. 21 and 22. The bicycle operating device 210 has the same structure and/or configuration as those of the bicycle operating device 10 except for the support plate 88. Thus, elements having substantially the same function as those in the first embodiment will be numbered the same here, and will not be described and/or illustrated again in detail here for the sake of brevity.

Figure 21:
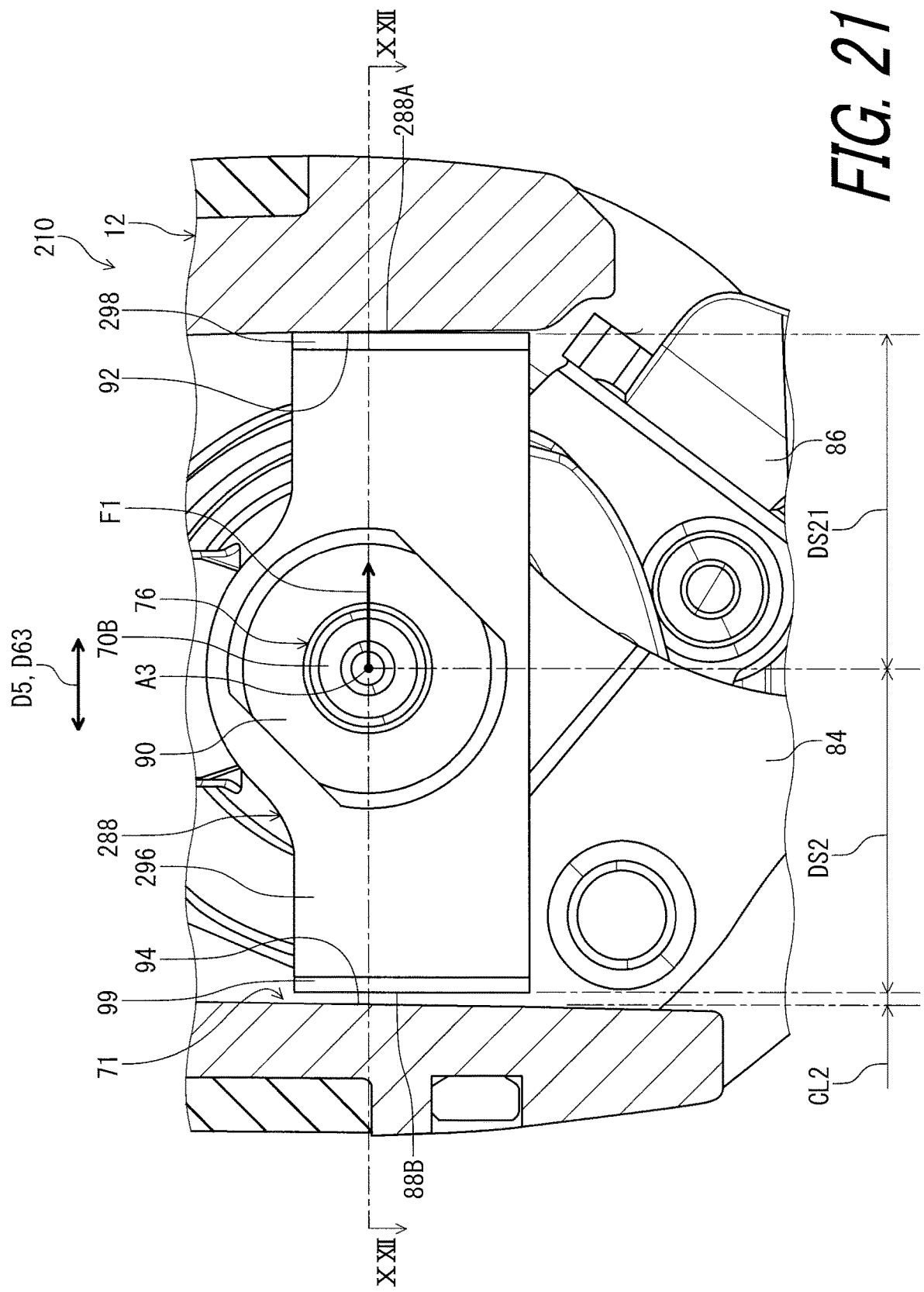
FIG. 21 is a cross-sectional view of a bicycle operating device in accordance with a second embodiment.
Figure 22:
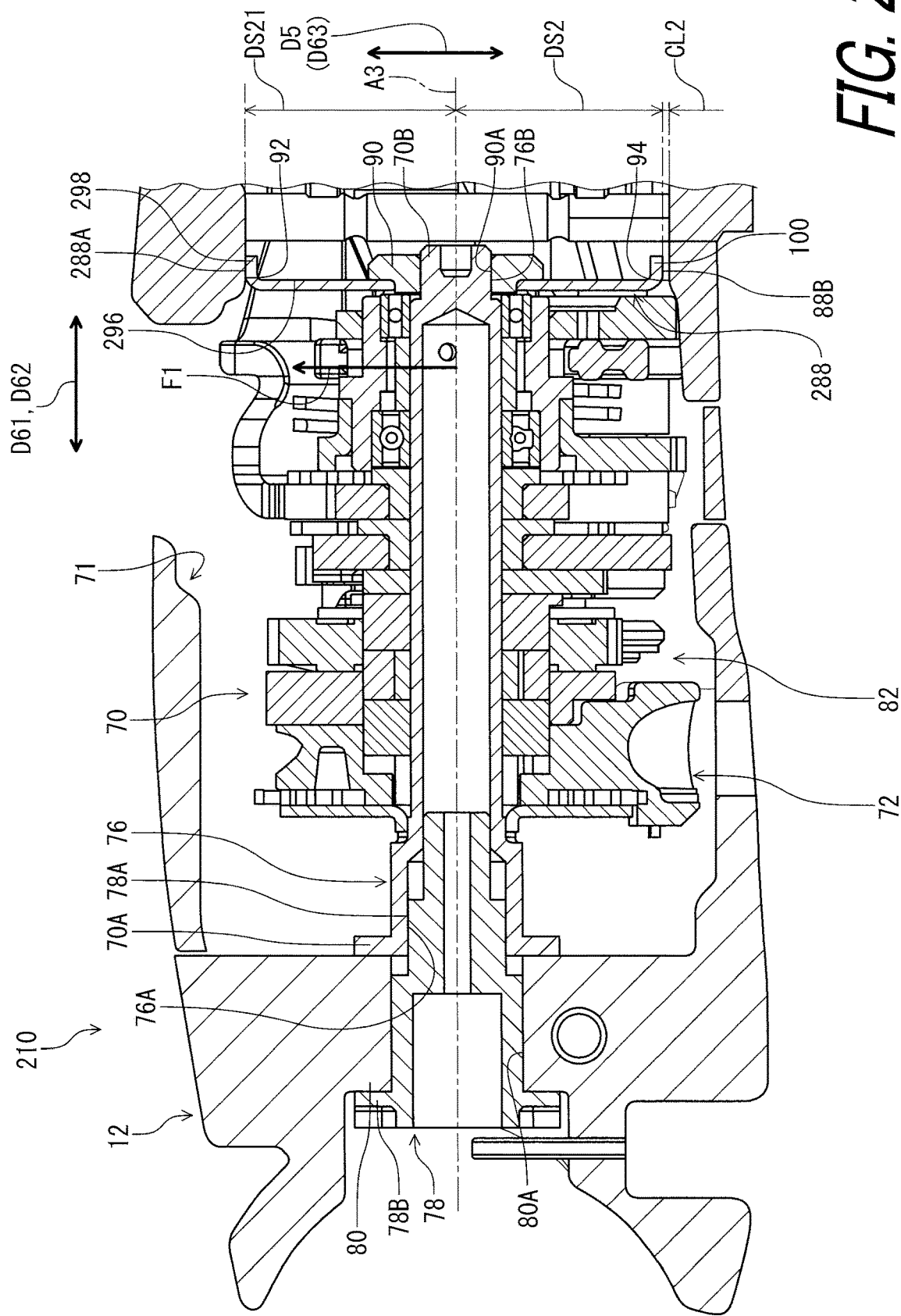
FIG. 22 is a cross-sectional view of the bicycle operating device taken along line XXII-XXII of FIG. 21.

As seen in FIGS. 21 and 22, the bicycle operating device 210 comprises the base member 12, the operating structure 70, and a support plate 288. The support plate 288 has substantially the same structure as that of the support plate 88 of the first embodiment. In this embodiment, the support plate 288 is in contact with the base member 12 in the rest state where the operating member 16 and the additional operating member 26 are not operated by the user. Specifically, the support plate 288 includes a first support surface 288A facing the first inner surface 92. The first support surface 288A of the support plate 288 is in contact with the first inner surface 92 of the base member 12 in the rest state where the operating member 16 and the additional operating member 26 are not operated by the user. Namely, a first clearance defined between the first support surface 88A of the support plate 88 and the first inner surface 92 of the base member 12 is equal to 0 mm. The second support surface 88B of the support plate 288 is spaced apart from the second inner surface 94 of the base member 12 in the rest state where the operating member 16 and the additional operating member 26 are not operated by the user. Since the second axial end 70B and the support plate 288 are provided in the base member 12 without being secured to the base member 12, the support plate 288 is secured to the second axial end 70B to be movable relative to the base member 12 even if the support plate 288 is in contact with the base member 12.

The support plate 288 includes a base part 296, a first part 298, and the second part 99. The base part 296 has substantially the same structure as that of the base part 96 of the first embodiment. The first part 298 has substantially the same structure as that of the first part 98 of the first embodiment. The first support surface 288A is provided on the first part 298.

A first minimum distance DS21 defined between the rotational axis A3 and the first support surface 288A is different from the second minimum distance DS2 defined between the rotational axis A3 and the second support surface 88B. The first minimum distance DS21 is larger than the second minimum distance DS2. However, the first minimum distance DS21 can be equal to the second minimum distance DS2.

With the bicycle operating device 210, it is possible to obtain the same effect as that of the bicycle operating device 10 of the first embodiment.

Third Embodiment

A bicycle operating device 310 in accordance with a third embodiment will be described below referring to FIGS. 23 and 24. The bicycle operating device 310 has the same structure and/or configuration as those of the bicycle operating device 10 except for the support plate 88. Thus, elements having substantially the same function as those in the above embodiments will be numbered the same here, and will not be described and/or illustrated again in detail here for the sake of brevity.

Figure 23:
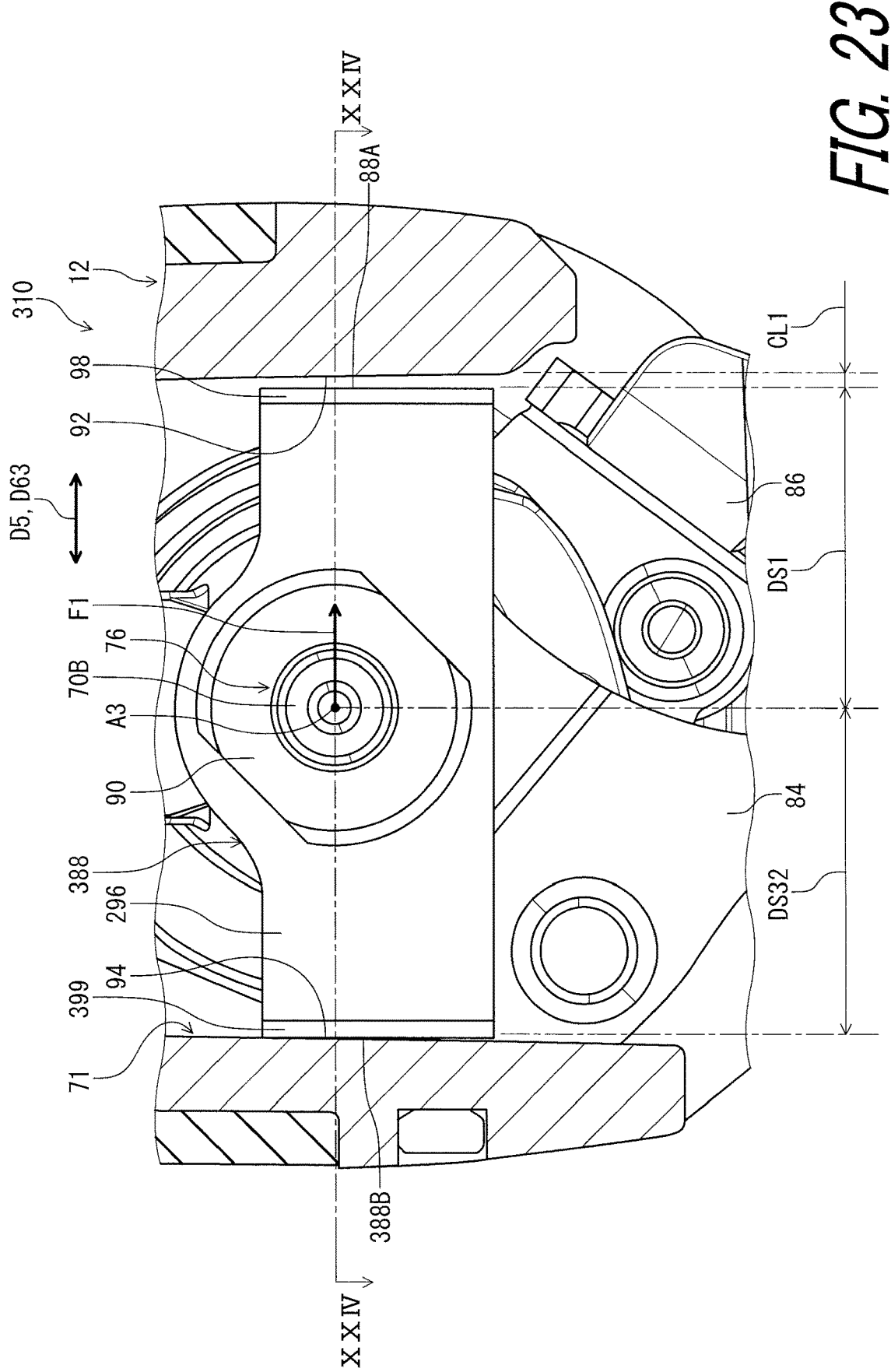
FIG. 23 is a cross-sectional view of a bicycle operating device in accordance with a third embodiment.
Figure 24:
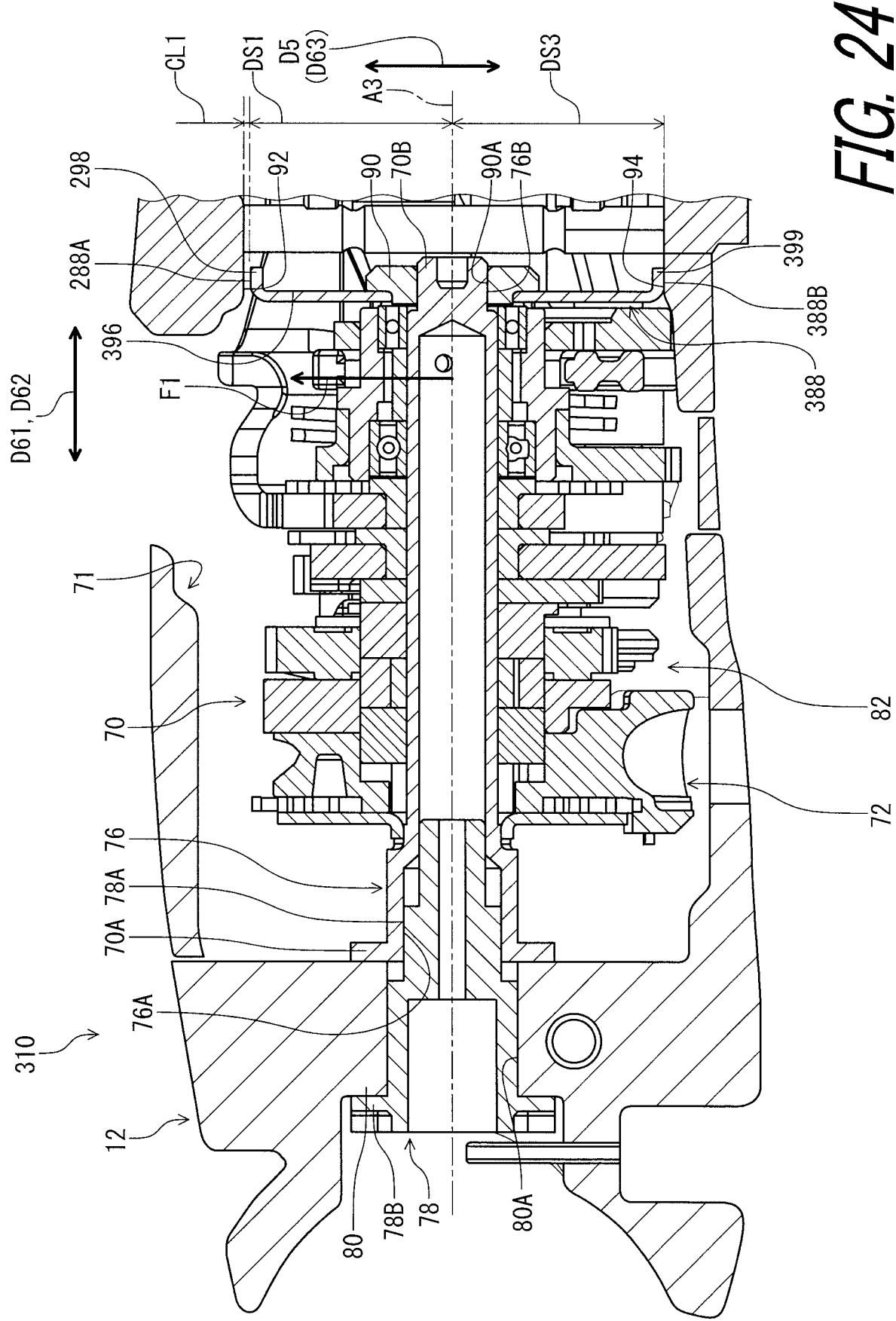
FIG. 24 is a cross-sectional view of the bicycle operating device taken along line XXIV-XXIV of FIG. 23.

As seen in FIGS. 23 and 24, the bicycle operating device 310 comprises the base member 12, the operating structure 70, and a support plate 388. The support plate 388 has substantially the same structure as that of the support plate 88 of the first embodiment. In this embodiment, the support plate 388 is in contact with the base member 12 in the rest state where the operating member 16 and the additional operating member 26 are not operated by the user. Specifically, the support plate 388 includes a second support surface 388B facing the second inner surface 94. The second support surface 388B of the support plate 388 is in contact with the second inner surface 94 of the base member 12 in the rest state where the operating member 16 and the additional operating member 26 are not operated by the user. Namely, a second clearance defined between the second support surface 388B of the support plate 388 and the second inner surface 94 of the base member 12 is equal to 0 mm. The first support surface 88A of the support plate 388 is spaced apart from the first inner surface 92 of the base member 12 in the rest state where the operating member 16 and the additional operating member 26 are not operated by the user. Since the second axial end 70B and the support plate 388 are provided in the base member 12 without being secured to the base member 12, the support plate 388 is secured to the second axial end 70B to be movable relative to the base member 12 even if the support plate 388 is in contact with the base member 12.

The support plate 388 includes a base part 396, the first part 98, and a second part 399. The base part 396 has substantially the same structure as that of the base part 96 of the first embodiment. The second part 399 has substantially the same structure as that of the second part 99 of the first embodiment. The second support surface 388B is provided on the second part 399.

The first minimum distance DS1 defined between the rotational axis A3 and the first support surface 88A is different from a second minimum distance DS32 defined between the rotational axis A3 and the second support surface 388B. The second minimum distance DS32 is larger than the first minimum distance DS1. However, the first minimum distance DS1 can be equal to the second minimum distance DS32.

With the bicycle operating device 310, it is possible to obtain the same effect as that of the bicycle operating device 10 of the first embodiment.

Fourth Embodiment

A bicycle operating device 410 in accordance with a fourth embodiment will be described below referring to FIGS. 25 and 26. The bicycle operating device 210 has the same structure and/or configuration as those of the bicycle operating device 10 except for the support plate 88. Thus, elements having substantially the same function as those in the above embodiments will be numbered the same here, and will not be described and/or illustrated again in detail here for the sake of brevity.

Figure 25:
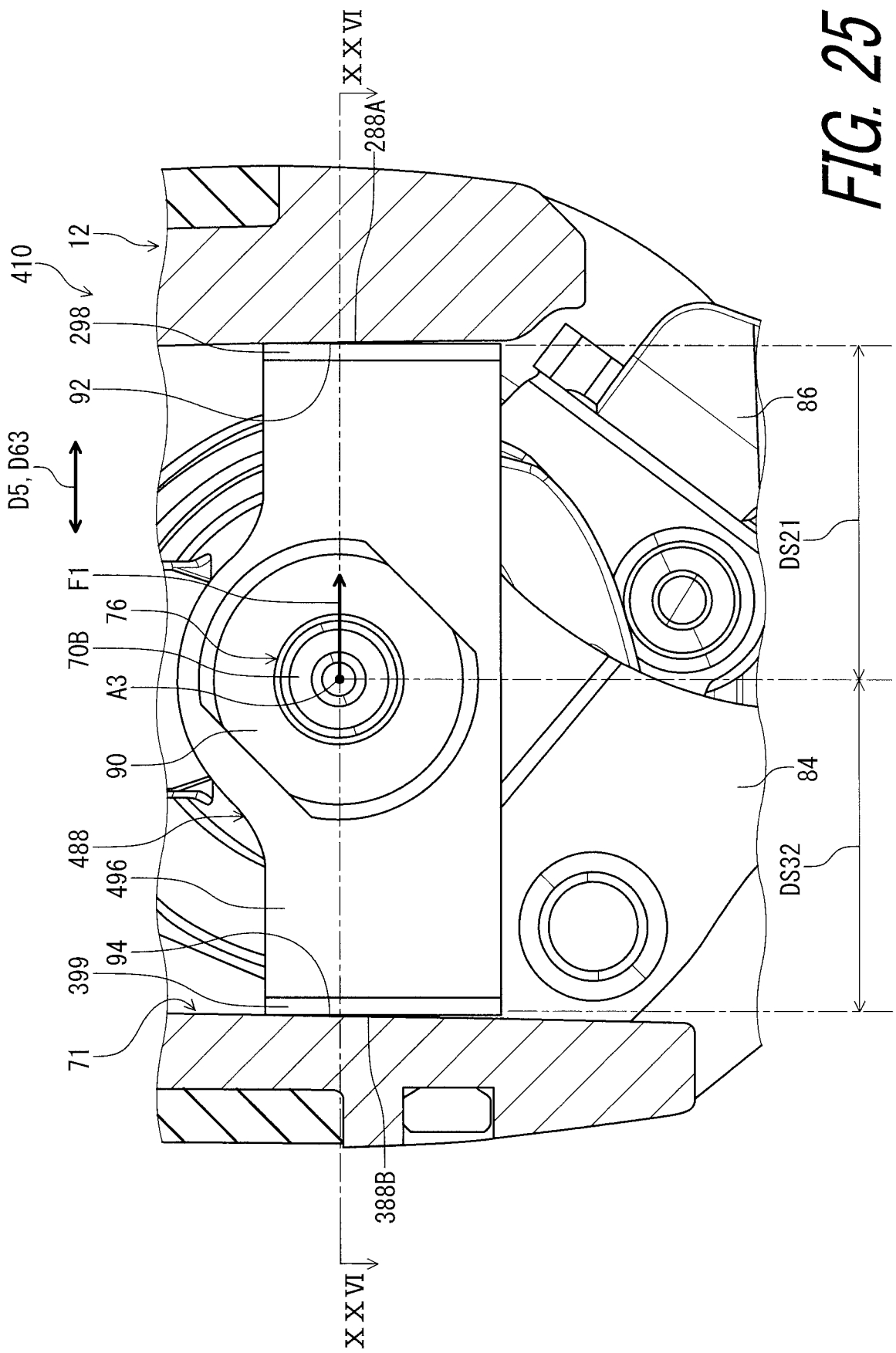
FIG. 25 is a cross-sectional view of a bicycle operating device in accordance with a fourth embodiment.
Figure 26:
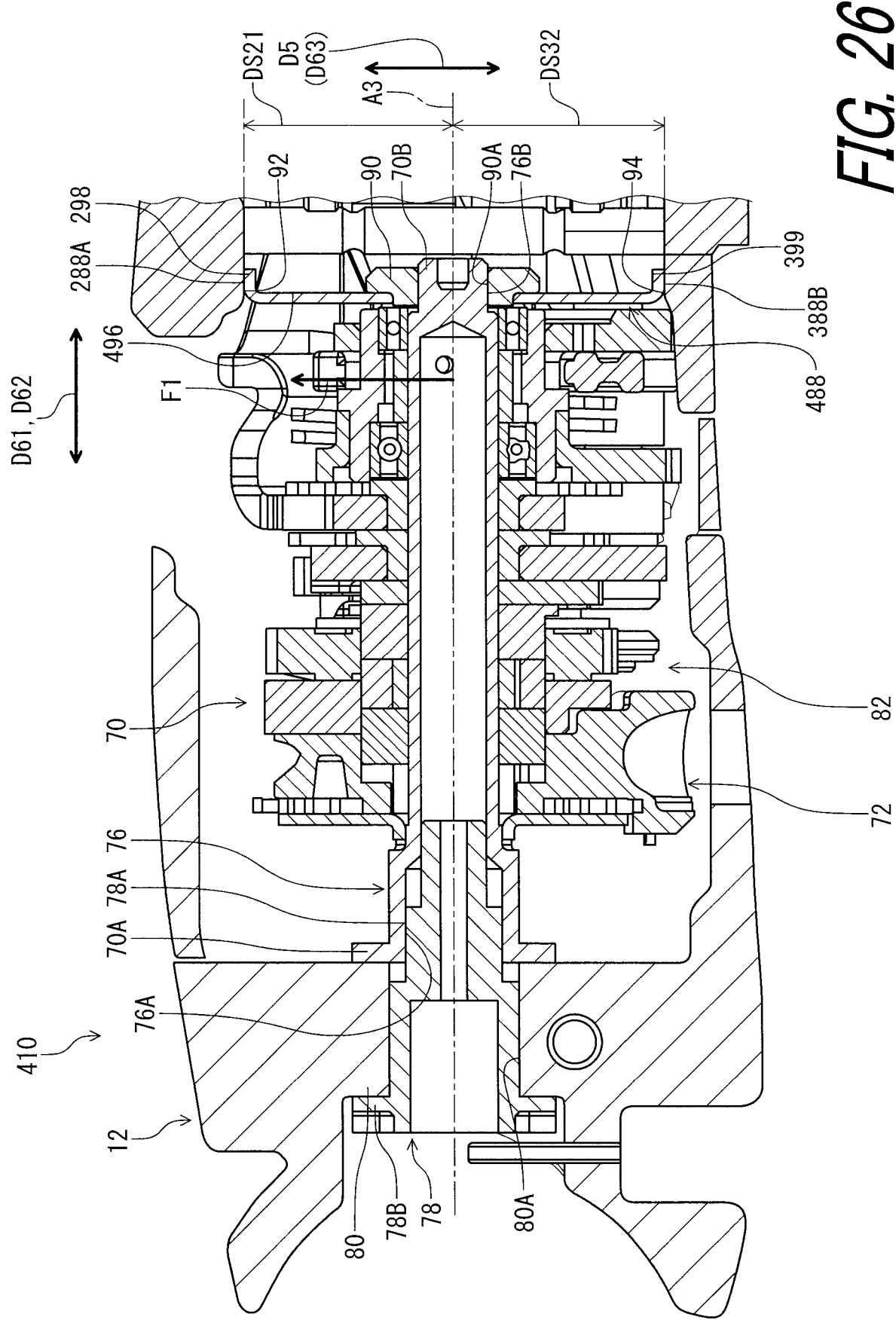
FIG. 26 is a cross-sectional view of the bicycle operating device taken along line XXVI-XXVI of FIG. 25.

As seen in FIGS. 25 and 26, the bicycle operating device 410 comprises the base member 12, the operating structure 70, and a support plate 488. In this embodiment, the support plates 288 and 388 of the second and third embodiments are combined with each other. The support plate 488 is in contact with the base member 12 in the rest state where the operating member 16 and the additional operating member 26 are not operated by the user. Since the second axial end 70B and the support plate 488 are provided in the base member 12 without being secured to the base member 12, the support plate 488 is secured to the second axial end 70B to be movable relative to the base member 12 even if the support plate 388 is in contact with the base member 12.

Specifically, the support plate 488 includes the first support surface 288A facing the first inner surface 92. The support plate 488 includes the second support surface 388B facing the second inner surface 94. The first support surface 288A of the support plate 488 is in contact with the first inner surface 92 of the base member 12 in the rest state where the operating member 16 and the additional operating member 26 are not operated by the user. The second support surface 388B of the support plate 388 is in contact with the second inner surface 94 of the base member 12 in the rest state where the operating member 16 and the additional operating member 26 are not operated by the user. Namely, a first clearance defined between the first support surface 88A of the support plate 88 and the first inner surface 92 of the base member 12 is equal to 0 mm. A second clearance defined between the second support surface 388B of the support plate 388 and the second inner surface 94 of the base member 12 is equal to 0 mm.

The support plate 488 includes a base part 496, the first part 298, and the second part 399. The base part 496 has substantially the same structure as that of the base part 96 of the first embodiment. The first minimum distance DS21 defined between the rotational axis A3 and the first support surface 288A is equal to the second minimum distance DS32 defined between the rotational axis A3 and the second support surface 388B. However, the first minimum distance DS21 can be different from the second minimum distance DS32.

With the bicycle operating device 410, it is possible to obtain the same effect as that of the bicycle operating device 10 of the first embodiment.

Fifth Embodiment

A bicycle operating device 510 in accordance with a fifth embodiment will be described below referring to FIGS. 27 and 28. The bicycle operating device 510 has the same structure and/or configuration as those of the bicycle operating device 10 except for the support plate 88. Thus, elements having substantially the same function as those in the above embodiments will be numbered the same here, and will not be described and/or illustrated again in detail here for the sake of brevity.

Figure 27:
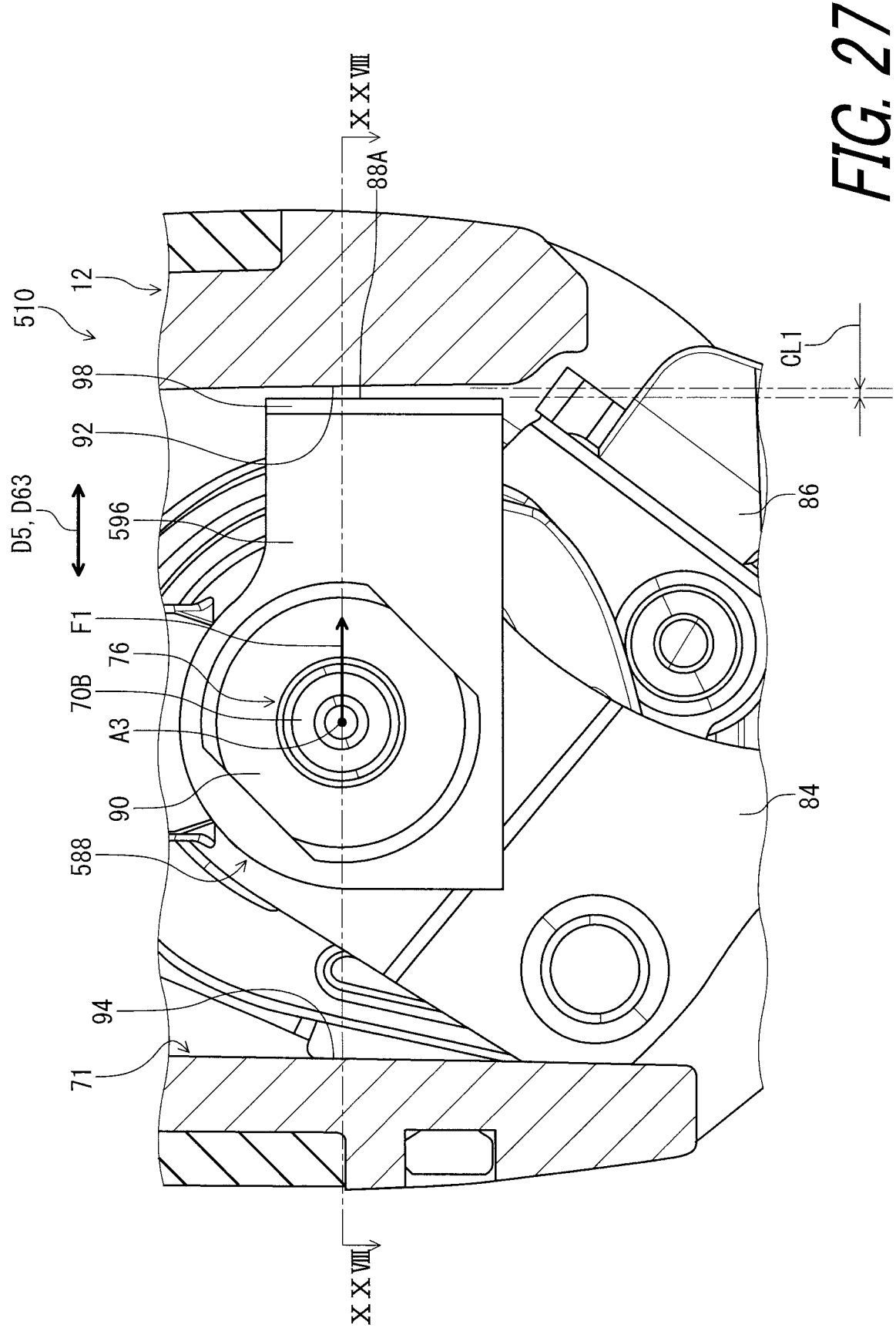
FIG. 27 is a cross-sectional view of a bicycle operating device in accordance with a fifth embodiment.
Figure 28:
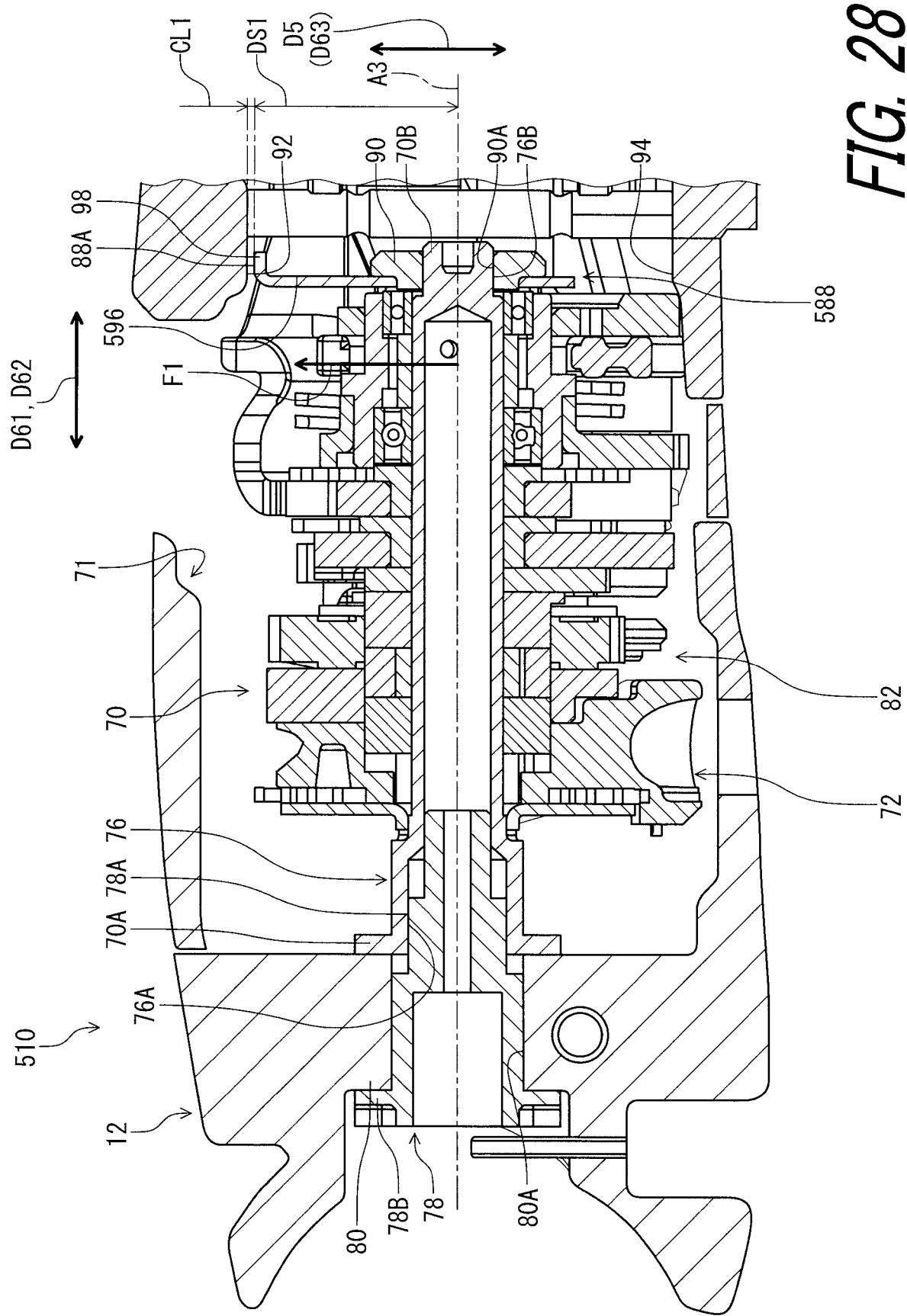
FIG. 28 is a cross-sectional view of the bicycle operating device taken along line XXVIII-XXVIII of FIG. 27.

As seen in FIGS. 27 and 28, the bicycle operating device 510 comprises the base member 12, the operating structure 70, and a support plate 588. The support plate 588 has substantially the same structure as that of the support plate 88 of the first embodiment. In this embodiment, the second support surface 88B is omitted from the support plate 588.

The support plate 588 includes a base part 596 and the first part 98. The base part 596 has substantially the same structure as that of the base part 96 of the first embodiment. The base part 596 is shorter than the base part 96 of the support plate 88 of the first embodiment in the third direction D63 (the facing direction D5).

With the bicycle operating device 510, it is possible to obtain the same effect as that of the bicycle operating device 10 of the first embodiment.

Sixth Embodiment

A bicycle operating device 610 in accordance with a sixth embodiment will be described below referring to FIGS. 29 and 30. The bicycle operating device 610 has the same structure and/or configuration as those of the bicycle operating device 10 except for the support plate 88. Thus, elements having substantially the same function as those in the above embodiments will be numbered the same here, and will not be described and/or illustrated again in detail here for the sake of brevity.

Figure 29:
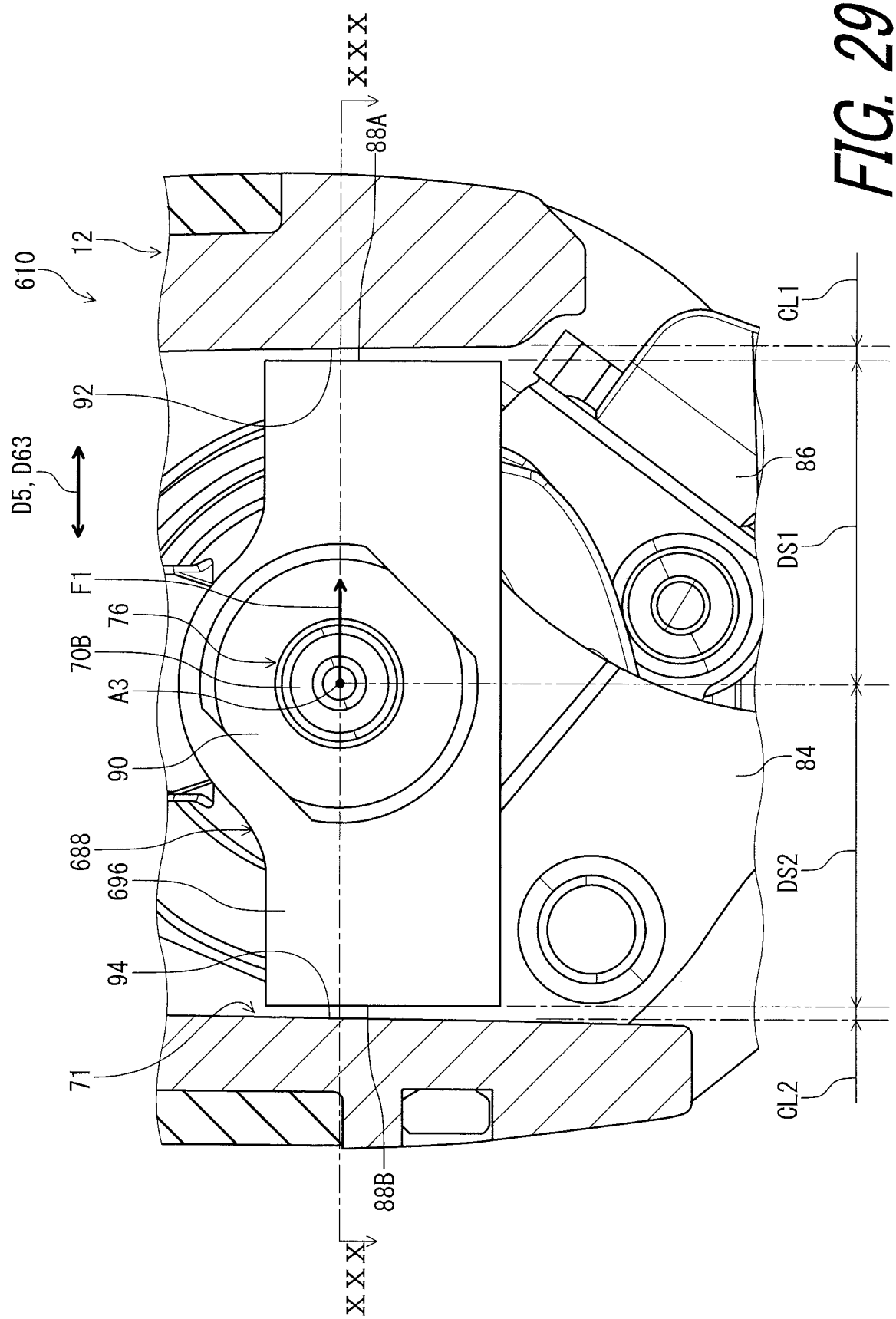
FIG. 29 is a cross-sectional view of a bicycle operating device in accordance with a sixth embodiment.
Figure 30:
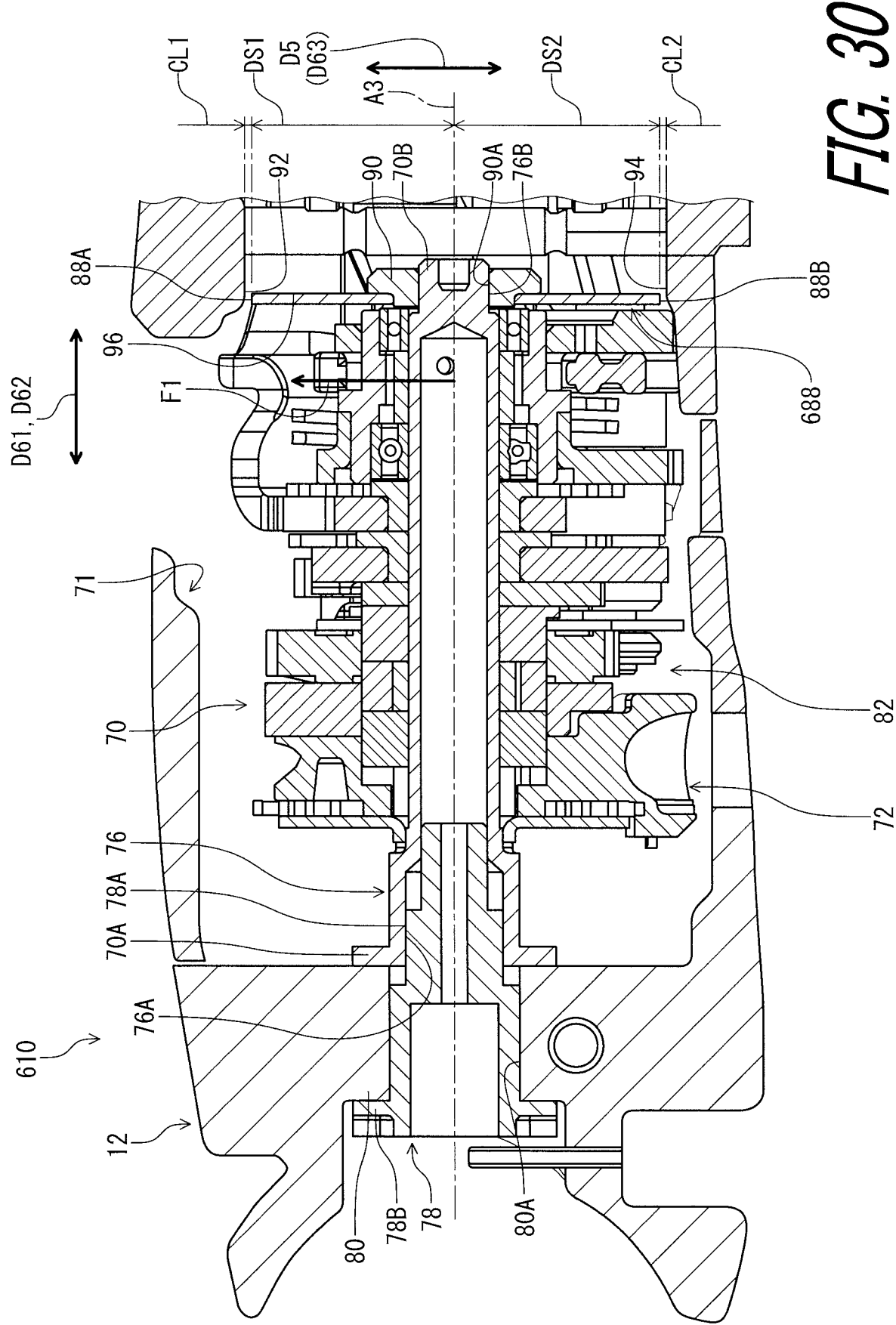
FIG. 30 is a cross-sectional view of the bicycle operating device taken along line XXX-XXX of FIG. 29.

As seen in FIGS. 29 and 30, the bicycle operating device 610 comprises the base member 12, the operating structure 70, and a support plate 688. The support plate 688 has substantially the same structure as that of the support plate 88 of the first embodiment. In this embodiment, the first part 98 and the second part 99 are omitted from the support plate 688.

The support plate 588 includes a base part 696. The base part 696 has substantially the same structure as that of the base part 96 of the first embodiment. The base part 696 includes the first support surface 88A and the second support surface 88B.

With the bicycle operating device 610, it is possible to obtain the same effect as that of the bicycle operating device 10 of the first embodiment.

It will be apparent to those skilled in the bicycle field from the present disclosure that the above embodiments can be at least partly combined with each other if needed and/or desired. For example, the second support surface 88B can be omitted from at least one of the bicycle operating devices 10 and 210. The second support surface 388B can be omitted from at least one of the bicycle operating devices 310 and 410. In the bicycle operating device 510 of the fifth embodiment, the first support surface 88A can be in contact with the first inner surface 92 in the rest state where the operating member 16 and the additional operating member 26 are not operated by the user. Similarly to the bicycle operating device 610 of the sixth embodiment, at least one of the first part and the second part can be omitted from the support plate in bicycle operating devices 10 to 510 of the first to fifth embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a base member;
an operating structure including a rotatable member rotatable relative to the base member about a rotational axis to control a bicycle component, the operating structure including
a first axial end secured to the base member, and
a second axial end opposite to the first axial end along the rotational axis; and
a support plate attached to the second axial end to be stationary relative to the second axial end and to be movable relative to the base member when in an assembled state, the support plate being spaced apart from the base member when the operating structure is at rest, the support plate being contactable with the base member during operation of the operating structure.

2. The bicycle operating device according to claim 1, wherein
the base member includes a first inner surface, and
the support plate includes a first support surface facing the first inner surface.

3. The bicycle operating device according to claim 2, wherein
a first clearance is defined between the first support surface of the support plate and the first inner surface of the base member, the first clearance being greater than 0 mm.

4. The bicycle operating device according to claim 3, wherein
the first clearance is equal to or smaller than 5 mm and greater than 0 mm.

5. The bicycle operating device according to claim 4, wherein
the first clearance is equal to or smaller than 1 mm and greater than 0 mm.

6. The bicycle operating device according to claim 2, wherein
the first support surface of the support plate is in contact with the first inner surface of the base member.

7. The bicycle operating device according to claim 2, wherein
the base member includes a second inner surface, and
the support plate includes a second support surface facing the second inner surface.

8. The bicycle operating device according to claim 7, wherein
a second clearance is defined between the second support surface of the support plate and the second inner surface of the base member.

9. A bicycle operating device comprising:
a base member;
an operating structure including a rotatable member rotatable relative to the base member about a rotational axis to control a bicycle component, the operating structure including
a first axial end secured to the base member, and
a second axial end opposite to the first axial end along the rotational axis; and
a support plate attached to the second axial end to be movable relative to the base member when in an assembled state, the support plate being contactable with the base member, wherein
the base member includes a first inner surface,
the support plate includes a first support surface facing the first inner surface,
the base member includes a second inner surface,
the support plate includes a second support surface facing the second inner surface,
a second clearance is defined between the second support surface of the support plate and the second inner surface of the base member, and
the second clearance is equal to or smaller than 5 mm.

10. The bicycle operating device according to claim 9, wherein
the second clearance is equal to or smaller than 1 mm.

11. The bicycle operating device according to claim 7, wherein
the rotational axis is provided between the first support surface and the second support surface as viewed along the rotational axis.

12. The bicycle operating device according to claim 2, wherein
the support plate includes
a base part attached to the second axial end of the operating structure, and
a first part extending from the base part along the first inner surface, the first support surface being provided on the first part.

13. The bicycle operating device according to claim 12, wherein
the base member includes a second inner surface,
the support plate includes
a second support surface facing the second inner surface, and
a second part extending from the base part along the second inner surface, the second support surface being provided on the second part.

14. The bicycle operating device according to claim 13, wherein
the first part extends from the base part in a first direction,
the second part extends from the base part in a second direction, and
the base part extends from the second axial end in a third direction different from each of the first direction and the second direction.

15. The bicycle operating device according to claim 14, wherein
at least one of the first direction and the second direction is parallel to the rotational axis.

16. The bicycle operating device according to claim 14, wherein
the third direction is perpendicular to the rotational axis.

17. The bicycle operating device according to claim 14, wherein
at least one of the first support surface and the second support surface faces in the third direction.

18. The bicycle operating device according to claim 1, wherein
the bicycle component includes a shift device configured to change a gear position, and
the rotatable member is rotatable relative to the base member about the rotational axis to operate the shift device.

19. The bicycle operating device according to claim 1, wherein
the base member includes
a first end portion configured to be coupled to a bicycle handlebar in a mounting state where the bicycle operating device is mounted to the bicycle handlebar, and
a second end portion opposite to the first end portion, and
the operating structure is provided between the first end portion and the second end portion.

20. The bicycle operating device according to claim 19, wherein
the first end portion includes a mounting surface having a curved shape corresponding to a drop-down handlebar.

21. The bicycle operating device according to claim 19, wherein
the base member includes a grip portion arranged between the first end portion and the second end portion.

22. The bicycle operating device according to claim 19, wherein
the second end portion includes a pommel portion.

23. The bicycle operating device according to claim 1, wherein
the operating structure includes a rotational shaft rotatably supporting the rotatable member about the rotational axis, and
the rotational shaft includes the first axial end and the second axial end and extends between the first axial end and the second axial end.

24. A bicycle operating device comprising:
a base member including a first inner surface;
an operating structure including a rotatable member rotatable relative to the base member about a rotational axis to control a bicycle component, the operating structure including
a first axial end secured to a first portion of the base member, and
a second axial end opposite to the first axial end along the rotational axis; and
a support plate attached to the second axial end, the support plate including a first support surface facing the first inner surface in a facing direction different from a direction parallel to the rotational axis, the support plate being spaced apart from the base member when the operating structure is at rest, the support plate being movable relative to the first portion of the base member when in an assembled state during operation of the operating structure, wherein
the support plate is movable in the facing direction relative to the first portion of the base member when in the assembled state during operation of the operating structure.

25. The bicycle operating device according to claim 24, wherein
the facing direction is perpendicular to the rotational axis.

26. The bicycle operating device according to claim 24, wherein
a first clearance is defined between the first support surface of the support plate and the first inner surface of the base member, the first clearance being greater than 0 mm.

27. The bicycle operating device according to claim 26, wherein
the first clearance is equal to or smaller than 5 mm and greater than 0 mm.

28. The bicycle operating device according to claim 27, wherein
the first clearance is equal to or smaller than 1 mm and greater than 0 mm.

29. A bicycle operating device comprising:
a base member;
an operating structure including a rotatable member rotatable relative to the base member about a rotational axis to control a bicycle component, the operating structure including
a first axial end secured to the base member, and
a second axial end opposite to the first axial end along the rotational axis; and
a support plate attached to the second axial end to be movable relative to the base member when in an assembled state, the support plate being spaced apart from the base member when the operating structure is at rest, the support plate being contactable with the base member during operation of the operating structure, wherein
the operating structure includes a rotational shaft that is a cantilever shaft that is secured to the base member at the first axial end.

30. The bicycle operating device according to claim 1, wherein the support plate is movable relative to the base member when in the assembled state in a direction different from a direction parallel to the rotational axis.

31. The bicycle operating device according to claim 1, wherein the support plate is movable relative to the base member when in the assembled state in a direction perpendicular to the rotational axis.

32. A bicycle operating device comprising:

a base member;

an operating structure including a rotatable member rotatable relative to the base member about a rotational axis to control a bicycle component, the operating structure including a first axial end secured to the base member, and a second axial end opposite to the first axial end along the rotational axis; and a support plate attached to the second axial end to be movable relative to the base member when in an assembled state, the support plate being spaced apart from the base member when the operating structure is at rest, the support plate being contactable with the base member during operation of the operating structure, wherein the support plate is spaced apart from the base member by a clearance in a direction perpendicular to the rotational axis when the operating structure is at rest, and the support plate is contactable with the base member during operation of the operating structure such that the clearance in the direction perpendicular to the rotational axis becomes 0 mm.

\* \* \* \* \*